(12) United States Patent  
Bieswanger et al.

(10) Patent No.: US 9,081,613 B2  
(45) Date of Patent: Jul. 14, 2015

(54) UNIFIED RESOURCE MANAGER PROVIDING A SINGLE POINT OF CONTROL

(75) Inventors: Andreas Bieswanger, Ehningen (DE); Patrick J. Callaghan, Vestal, NY (US); Joseph M. Gdaniec, Cary, NC (US); Harm I. Osterndorf, Nagold (DE); Kurt N. Schroeder, Endicott, NY (US); Paul E. Rogers, Johnson City, NY (US); Brian D. Valentine, Endwell, NY (US); Eric A. Weinmann, Owego, NY (US); Friedrich M. Welter, Gaertringen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 20 days.

(21) Appl. No.: 12/938,345

(22) Filed: Nov. 2, 2010

(65) Prior Publication Data

US 2012/0110588 A1 May 3, 2012

(51) Int. Cl.
*G06F 9/455* (2006.01)
*G06F 9/46* (2006.01)
*G06F 15/173* (2006.01)
*G06F 9/50* (2006.01)
*G06F 9/445* (2006.01)

(52) U.S. Cl.
CPC .. *G06F 9/50* (2013.01); *G06F 8/65* (2013.01); *G06F 9/45533* (2013.01); *G06F 9/5077* (2013.01); *G06F 9/5094* (2013.01); *Y02B 60/142* (2013.01); *Y02B 60/167* (2013.01); *Y02B 60/183* (2013.01)

(58) Field of Classification Search
USPC .......... 718/100, 102, 104, 106; 709/223, 224, 709/226
See application file for complete search history.

(56) References Cited

U.S. PATENT DOCUMENTS

| | | | |
|---|---|---|---|
| 6,014,700 | A | 1/2000 | Bainbridge et al. |
| 6,145,001 | A | 11/2000 | Scholl et al. |
| 6,877,035 | B2 | 4/2005 | Shahabuddin et al. |
| 7,032,186 | B1 | 4/2006 | Gasser et al. |
| 7,080,378 | B1 | 7/2006 | Noland et al. |
| 7,296,089 | B2 | 11/2007 | Krishnamurthy et al. |
| 7,383,327 | B1 | 6/2008 | Tormasov et al. |
| 7,533,385 | B1 | 5/2009 | Barnes |

(Continued)

FOREIGN PATENT DOCUMENTS

| | | |
|---|---|---|
| EP | 0456249 A2 | 10/1991 |
| EP | 0457108 A2 | 11/1991 |

(Continued)

OTHER PUBLICATIONS

International Search Report and Written Opinion for PCT/EP2011/067440 dated Feb. 28, 2012.

(Continued)

*Primary Examiner* — Charles Swift  
(74) *Attorney, Agent, or Firm* — William A. Kinnaman, Esq.; Matthew M. Hulihan, Esq.; Heslin Rothenberg Farley & Mesiti PC

(57) ABSTRACT

An integrated hybrid system is provided. The hybrid system includes compute components of different types and architectures that are integrated and managed by a single point of control to provide federation and the presentation of the compute components as a single logical computing platform.

19 Claims, 16 Drawing Sheets

(56) References Cited

U.S. PATENT DOCUMENTS

| | | | |
|---|---|---|---|
| 7,574,491 B2 | 8/2009 | Stein et al. | |
| 7,644,410 B1 | 1/2010 | Graupner et al. | |
| 7,657,536 B2 | 2/2010 | Newport | |
| 7,694,298 B2 | 4/2010 | Goud et al. | |
| 7,702,809 B1 | 4/2010 | Szabo et al. | |
| 7,734,676 B2 | 6/2010 | Dritschler et al. | |
| 7,783,743 B1 | 8/2010 | Brown | |
| 7,801,976 B2 | 9/2010 | Hodges et al. | |
| 7,840,398 B2 | 11/2010 | Zimmer et al. | |
| 7,865,893 B1 | 1/2011 | Omelyanchuk et al. | |
| 7,890,458 B2 | 2/2011 | Dias et al. | |
| RE42,726 E | 9/2011 | Keshav et al. | |
| 8,065,541 B2 | 11/2011 | Baba et al. | |
| 8,255,350 B2 | 8/2012 | Lindenlaub et al. | |
| 8,291,416 B2 | 10/2012 | Cartales | |
| 8,312,175 B2 | 11/2012 | Patale et al. | |
| 8,477,610 B2 | 7/2013 | Zuo et al. | |
| 2001/0039581 A1* | 11/2001 | Deng et al. | 709/226 |
| 2003/0033460 A1 | 2/2003 | King et al. | |
| 2004/0015977 A1 | 1/2004 | Benke et al. | |
| 2004/0044685 A1* | 3/2004 | Huynh et al. | 707/104.1 |
| 2004/0128546 A1 | 7/2004 | Blakley, III et al. | |
| 2004/0181794 A1* | 9/2004 | Coleman et al. | 718/104 |
| 2004/0210623 A1 | 10/2004 | Hydrie et al. | |
| 2005/0015430 A1 | 1/2005 | Rothman et al. | |
| 2005/0044205 A1* | 2/2005 | Sankaranarayan et al. | 709/223 |
| 2005/0060531 A1 | 3/2005 | Davis et al. | |
| 2005/0108425 A1 | 5/2005 | Rabinovitch | |
| 2005/0198196 A1* | 9/2005 | Bohn et al. | 709/217 |
| 2005/0204040 A1* | 9/2005 | Ferri et al. | 709/225 |
| 2005/0235289 A1* | 10/2005 | Barillari et al. | 718/100 |
| 2005/0262182 A1* | 11/2005 | Thole | 709/200 |
| 2005/0262506 A1* | 11/2005 | Dawson et al. | 718/100 |
| 2006/0161764 A1 | 7/2006 | Alexander et al. | |
| 2006/0161923 A1 | 7/2006 | Ghoman et al. | |
| 2006/0184349 A1* | 8/2006 | Goud et al. | 703/24 |
| 2006/0236324 A1* | 10/2006 | Gissel et al. | 718/105 |
| 2007/0094367 A1 | 4/2007 | Esfahany et al. | |
| 2007/0179992 A1 | 8/2007 | Lynch | |
| 2007/0192863 A1 | 8/2007 | Kapoor et al. | |
| 2007/0233838 A1 | 10/2007 | Takamoto et al. | |
| 2007/0266136 A1 | 11/2007 | Esfahany et al. | |
| 2007/0288512 A1 | 12/2007 | Matsubara et al. | |
| 2008/0005306 A1* | 1/2008 | Kushalnagar et al. | 709/223 |
| 2008/0060068 A1 | 3/2008 | Mabayoje et al. | |
| 2008/0155100 A1 | 6/2008 | Ahmed et al. | |
| 2008/0215728 A1* | 9/2008 | Li et al. | 709/224 |
| 2008/0276243 A1* | 11/2008 | Sood | 718/104 |
| 2009/0037922 A1 | 2/2009 | Herington | |
| 2009/0043809 A1 | 2/2009 | Fakhouri et al. | |
| 2009/0070760 A1* | 3/2009 | Khatri et al. | 718/1 |
| 2009/0125901 A1* | 5/2009 | Swanson | 718/1 |
| 2009/0183186 A1 | 7/2009 | Murtagh | |
| 2009/0187776 A1* | 7/2009 | Baba et al. | 713/320 |
| 2009/0187970 A1* | 7/2009 | Mower et al. | 726/3 |
| 2009/0193427 A1* | 7/2009 | Pu et al. | 718/104 |
| 2009/0199193 A1* | 8/2009 | Jackson | 718/104 |
| 2009/0234823 A1* | 9/2009 | Wong | 707/4 |
| 2009/0249366 A1* | 10/2009 | Sen et al. | 719/327 |
| 2009/0259749 A1 | 10/2009 | Barrett et al. | |
| 2009/0271472 A1 | 10/2009 | Scheifler et al. | |
| 2009/0282404 A1* | 11/2009 | Khandekar et al. | 718/1 |
| 2009/0319544 A1* | 12/2009 | Griffin et al. | 707/100 |
| 2010/0058042 A1* | 3/2010 | Locker et al. | 713/2 |
| 2010/0115049 A1 | 5/2010 | Matsunaga et al. | |
| 2010/0115095 A1* | 5/2010 | Zhu et al. | 709/226 |
| 2010/0162252 A1 | 6/2010 | Bacher | |
| 2010/0180275 A1 | 7/2010 | Neogi et al. | |
| 2010/0205619 A1* | 8/2010 | Barsness et al. | 719/331 |
| 2010/0223217 A1 | 9/2010 | Little | |
| 2010/0268824 A1 | 10/2010 | Tanner et al. | |
| 2011/0078293 A1* | 3/2011 | Phung et al. | 709/222 |
| 2011/0138136 A1 | 6/2011 | Shitomi et al. | |
| 2011/0179170 A1* | 7/2011 | Gusev et al. | 709/226 |
| 2011/0185063 A1* | 7/2011 | Head et al. | 709/226 |
| 2011/0185292 A1* | 7/2011 | Chawla et al. | 715/760 |
| 2011/0213886 A1* | 9/2011 | Kelkar et al. | 709/226 |
| 2011/0231839 A1* | 9/2011 | Bennett et al. | 718/1 |
| 2011/0252224 A1* | 10/2011 | Chandrasekhara et al. | 713/2 |
| 2012/0011263 A1 | 1/2012 | Kamay et al. | |
| 2012/0030669 A1* | 2/2012 | Tsirkin | 718/1 |
| 2012/0039510 A1 | 2/2012 | Julia et al. | |
| 2012/0102163 A1 | 4/2012 | Witt et al. | |
| 2012/0110086 A1 | 5/2012 | Baitinger et al. | |
| 2012/0110154 A1 | 5/2012 | Adlung et al. | |
| 2012/0110155 A1 | 5/2012 | Adlung et al. | |
| 2012/0110164 A1 | 5/2012 | Frey et al. | |
| 2012/0110584 A1* | 5/2012 | Chaudhry et al. | 718/102 |
| 2012/0110588 A1 | 5/2012 | Bieswanger et al. | |
| 2012/0215921 A1 | 8/2012 | Adlung et al. | |
| 2012/0226788 A1* | 9/2012 | Jackson | 709/223 |
| 2013/0042123 A1 | 2/2013 | Smith et al. | |
| 2013/0111037 A1 | 5/2013 | Adlung et al. | |
| 2013/0111478 A1 | 5/2013 | Bieswanger et al. | |

FOREIGN PATENT DOCUMENTS

| | | |
|---|---|---|
| EP | 2109028 A2 | 10/2009 |
| GB | 2354611 A | 3/2001 |
| GB | 2357863 A | 7/2001 |
| JP | 2001034476 A | 2/2001 |
| KR | 100704300 B1 | 3/2007 |
| KR | 2009063122 A | 6/2009 |
| TW | 480859 | 3/2001 |
| WO | WO9500905 A1 | 1/1995 |
| WO | WO9923784 A2 | 5/1999 |
| WO | WO99/61981 | 12/1999 |
| WO | WO0123974 A2 | 4/2001 |
| WO | WO03026187 A2 | 3/2003 |
| WO | WO2004064429 A1 | 7/2004 |
| WO | WO2005089240 A2 | 9/2005 |
| WO | WO2008012159 A1 | 1/2008 |

OTHER PUBLICATIONS

Anonymous, "What's IBM's Announcement of the New zEnterprise, Unified Resource Manager, and zBX Really Means," Clabby Analytics Opinion, Jul. 2010, pp. 1-8, XP002668173, URL: ftp://public.dhe.ibm.com/common/ssi/ecm/en/zs103093usen/ZSL03093USEN.PDF.

Spruth, Wilhelm, "System z and z/OS Unique Characteristics," Aug. 2010, pp. 1-59, XP002668174, URL: http://www-ti.informatik.uni-tuebingen.de/spruth/Mirror/report.pdf.

International Search Report and Written Opinion for PCT/EP2011/067442 dated Jan. 2, 2012.

International Search Report and Written Opinion for PCT/EP2011/067443 Dated Dec. 30, 2011.

DiMarzio, Paul et al., "IBM System z Brand: zEnterprise Executive Overview," Jul. 2010 pp. 1-6.

Kwak, YoonSik et al., "An Analysis and Design of the Storage Management System Based on SMI 1.1.0," International Journal of u-and 3-Serivce, Science and Technology, vol. 3, No. 2, Jun. 3, 2010, pp. 51-60.

Rolia, Jerome et al., "Configuring Workload Manager Control Parameters for Resource Pools," IEEE, 2006, pp. 127-137.

Bennani, Mohamed et al., "Resource Allocation for Autonomic Data Centers Using Analytic Performance Models," Proceedings of the Second International Conference of Autonomic Computing, 2005.

Raman, Lakshmi, "OSI Systems and Network Management," IEEE Communications Magazine, Mar. 1998, pp. 46-53.

Foster, Ian et al., "Grid Services for Distributed System Integration," IEEE, Jun. 2002, pp. 37-46.

Moser, L.E. et al., "The Eternal System: An Architecture for Enterprise Applications," IEEE 1999, pp. 214-222.

International Search Report and Written Opinion for PCT/EP2011/067441 dated Jan. 12, 2012.

International Search Report and Written Opinion for PCT/EP2011/067444 dated Feb. 1, 2012.

Anonymous, "Fieldbus", Wikipedia, the free encyclopedia, Feb. 10, 2010, pp. 1-6, http://web.archive.org/web/20100210052245/http://en/wikipedia.org/wiki/Fieldbus.

(56) References Cited

OTHER PUBLICATIONS

Office Action for U.S. Appl. No. 12/938,341 dated Oct. 17, 2012.
Office Action for U.S. Appl. No. 12/459,151 dated Sep. 21, 2012.
Office Action for U.S. Appl. No. 12/938,329 dated Sep. 28, 2012.
Office Action for U.S. Appl. No. 12/938,332 dated Feb. 4, 2013.
Office Action for U.S. Appl. No. 12/938,348 dated Sep. 13, 2012.
Office Action for U.S. Appl. No. 13/459,151 dated Sep. 21, 2012.
Final Office Action for U.S. Appl. No. 12/938,329, dated Dec. 17, 2013, pp. 1-9.
Final Office Action for U.S. Appl. No. 13/717,032, dated Dec. 2, 2013, pp. 1-24.
Final Office Action for U.S. Appl. No. 13/459,151, dated Dec. 24, 2013, pp. 1-9.
Final Office Action for U.S. Appl. No. 13/681,481, dated Jan. 2, 2014, pp. 1-19.
Notice of Allowance for U.S. Appl. No. 12/938,348, dated Nov. 21, 2013, pp. 1-11.
Notice of Allowance for U.S. Appl. No. 13/681,103, dated Nov. 22, 2013, pp. 1-11.
Final Office Action for U.S. Appl. No. 12/938,332, dated Feb. 3, 2014, pp. 1-40.
Office Action for U.S. Appl. No. 13/459,151, dated Mar. 25, 2014, pp. 1-10.
Office Action for U.S. Appl. No. 12/938,329, dated Mar. 26, 2014, pp. 1-10.
Office Action for U.S. Appl. No. 13/722,575, dated Apr. 1, 2014, pp. 1-31.
Office Action for U.S. Appl. No. 13/717,032 dated Apr. 11, 2013, pp. 1-21.
Notice of Allowance for U.S. Appl. No. 12/938,348 dated Jan. 9, 2013, pp. 1-9.
Final Office Action for U.S. Appl. No. 12/938,341 dated May 1, 2013, pp. 1-33.
Office Action for U.S. Appl. No. 13/681,481, dated Jun. 13, 2013, pp. 1-16.
Office Action for U.S. Appl. No. 13/681,103, dated Jun. 13, 2013, pp. 1-16.
Office Action for U.S. Appl. No. 12/938,329, dated Aug. 26, 2013, pp. 1-16.
Office Action for U.S. Appl. No. 13/459,151, dated Sep. 10, 2013, pp. 1-7.
Office Action for U.S. Appl. No. 12/938,348, dated Sep. 13, 2013. pp. 1-8.
Final Office Action for U.S. Appl. No. 13/681,103, dated Sep. 12, 2013, pp. 1-9.
Final Office Action for U.S. Appl. No. 12/938,329 dated Feb. 20, 2013.
Final Office Action for U.S. Appl. No. 13/459,151 dated Feb. 20, 2013.
Office Action for U.S. Appl. No. 12/938,332, dated May 21, 2014, pp. 1-39.
Office Action for U.S. Appl. No. 13/681,481, dated May 30, 2014, pp. 1-26.
Notice of Allowance for U.S. Appl. No. 13/681,481, dated Oct. 7, 2014, pp. 1-21.
Office Action for U.S. Appl. No. 12/938,329, dated Jul. 24, 2014, pp. 1-15.
Office Action for U.S. Appl. No. 13/459,151, dated Jul. 23, 2014, pp. 1-14.
Office Action for U.S. Appl. No. 13/722,575, dated Jul. 28, 2014, pp. 1-18.
Advisory Action in corresponding U.S. Appl. No. 13/722,575, dated Oct. 8, 2014, 6 pages.
Office Action in U.S. Appl. No. 13/722,575, dated Nov. 10, 2014, pp. 1-18.
Office Action in U.S. Appl. No. 12/938,341, dated Dec. 16, 2014, pp. 1-63.
English Abstract of above-cited TW480859, Pandya, Suketu J., et al. "Software, systems and methods for managing a distributed network", dated Mar. 21, 2002, pp. 1-2; and Statement of Relevance co-filed herewith for TW480859.
Office Action in U.S. Appl. No. 13/717,032, dated Apr. 22, 2015, pp. 1-60.
Office Action for U.S. Appl. No. 12/938,341, dated May 6, 2015, pp. 1-29.

* cited by examiner

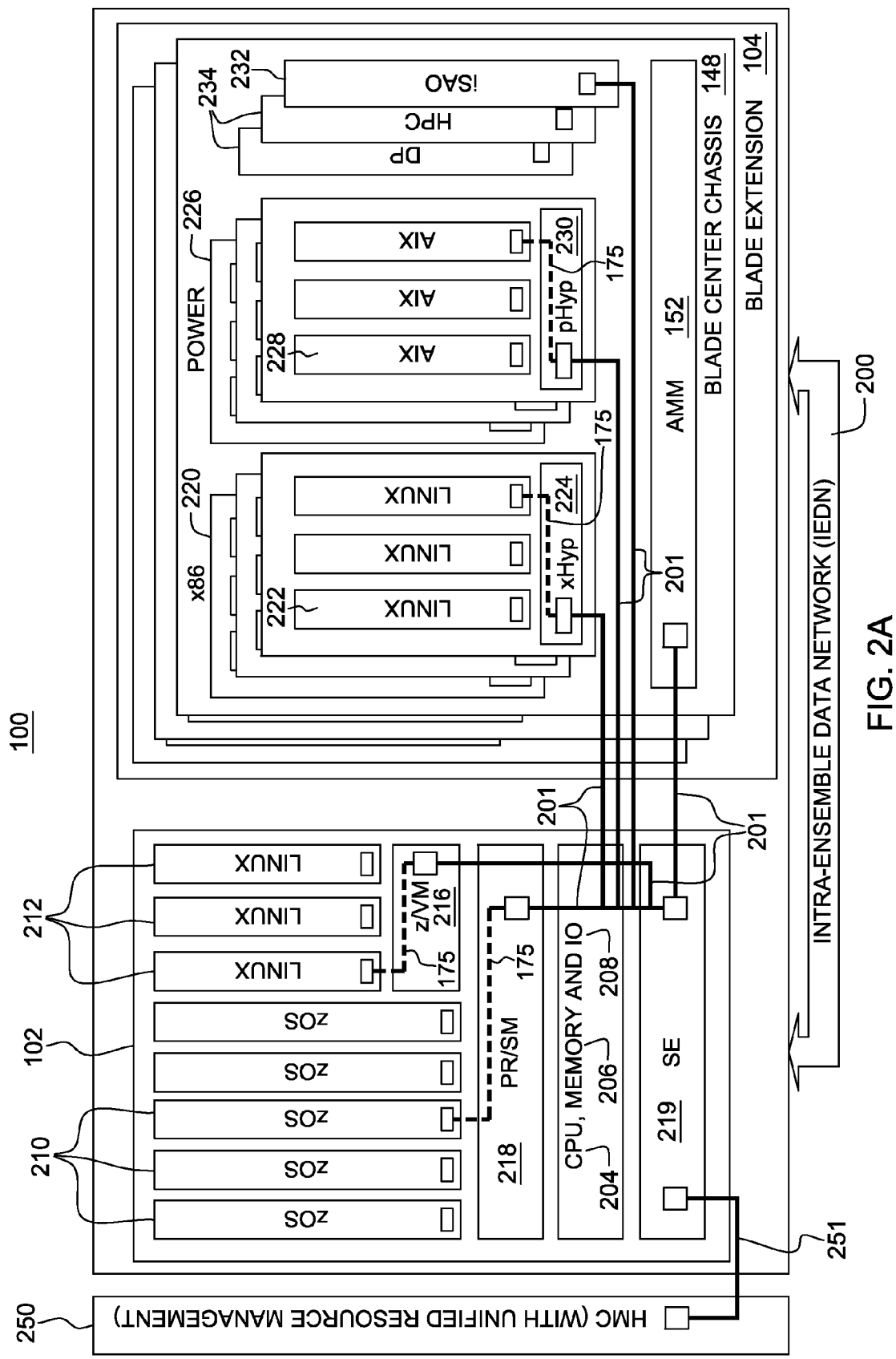

UNIFIED RESOURCE MANAGER PROVIDING A SINGLE POINT OF CONTROL

BACKGROUND

There are many types of computing systems, each having its own set of features, capabilities and advantages. As examples, there are general-purpose systems optimized for a broad set of applications or components, and special-purpose systems and accelerators optimized for a specific set of applications or components. Each type of system is defined, in part, by the instruction set architecture that it implements, and each is distinct from the others.

The general-purpose systems may include, for instance, mainframe computers able to provide high-end, high-availability, reliable services, and/or modular systems (e.g., blades of a blade center chassis), and the special-purpose systems may include co-processors or blades of a blade center chassis able to efficiently perform specific tasks. Each system manages its workload in its own individual manner and is separately responsible for performing requested services. Typically, each of the systems introduces its own specific administration model, resulting in system-specific management tooling, forming separate and distinct management silos.

The different system architectures are used to serve the disparate needs of the applications. Even for one application (e.g., a banking application, an online reservation application, etc.), multiple, disparate systems may be used, resulting in higher complexity and cost.

BRIEF SUMMARY

Integration of various types of computing systems into a hybrid computing system is provided, in one or more aspects of the present invention. In one example, physical and logical integration, as well as an advanced systems management function aimed at providing federation over the distinct elements of the processing system, are provided.

The shortcomings of the prior art are overcome and additional advantages are provided through the provision of a method of facilitating performing operations of a computing environment. The method includes, for instance, receiving by a first component of a first computing system of a first architecture a command from a resource manager of a second component of a second computing system of a second architecture, the second architecture being different from the first architecture and the resource manager adhering to a management model of the second computing system; and performing the command by the first component, the command used in performing an operation.

Systems and program products relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2A depicts further details of the hybrid computing system of FIG. 1A, in accordance with an aspect of the present invention;

DETAILED DESCRIPTION

In accordance with one or more aspects of the present invention, an integrated hybrid computing system is provided. The hybrid system includes compute components (a.k.a., elements) of different types and architectures that are integrated and managed by a single point of control to provide federation and the presentation of the compute components as a single logical computing platform. In one particular example, the single logical computing platform is the z/Enterprise™ system offered by International Business Machines Corporation.

In one example, the hybrid system includes a management function that integrates, monitors, and controls the heterogeneous compute resources as a single, logical, virtualized system. In one aspect, it optimizes the use of the compute resources in accordance with specified business service level objectives associated with business service workloads. The management provides dynamic provisioning and deployment of virtualized server, network and storage resources in a service optimized compute platform.

As one example, the hybrid system is dynamic and workload optimized, and in addition to the management, includes special-purpose workload accelerators and optimizers, and optionally general-purpose blades of a blade extension. The workload accelerators and optimizers extend and accelerate business service workloads, such as business service workloads running on a System z® system, offered by International Business Machines Corporation. System z® is a registered trademark of International Business Machines Corporation. Other names used herein may be registered trademarks, trademarks or product names of International Business Machines Corporation or other companies.

The blades incorporate additional compute components to host applications on their native processor architectures; to consolidate and manage a multiple tier, heterogeneous compute resources with reduced complexity and lower cost; and to enable better integration with transaction processing, messaging and data serving capabilities of a particular system, such as System z®.

Figure 1A:
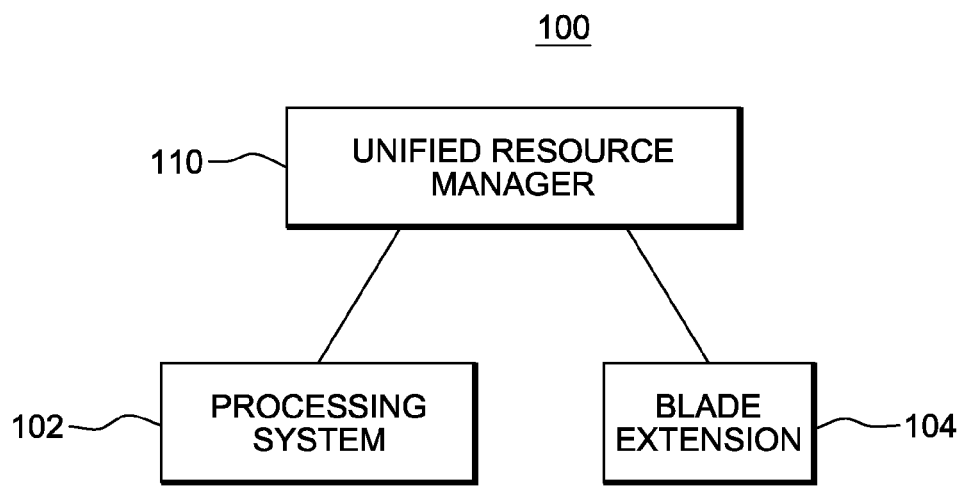
FIG. 1A depicts one example of a hybrid computing system, in accordance with an aspect of the present invention.

One example of a hybrid system is described with reference to FIG. 1A. As shown, in one example, a hybrid system 100 includes a processing system 102 and a blade extension 104, both of which are managed and controlled by a Unified Resource Manager (URM) 110. The hybrid system is an integration of the processing system and the blade extension, such that the components, although heterogeneous, are federated and logically integrated by a single point of control under a single administrative and management model (e.g., the model of the z/Enterprise™ system).

Figure 1B:
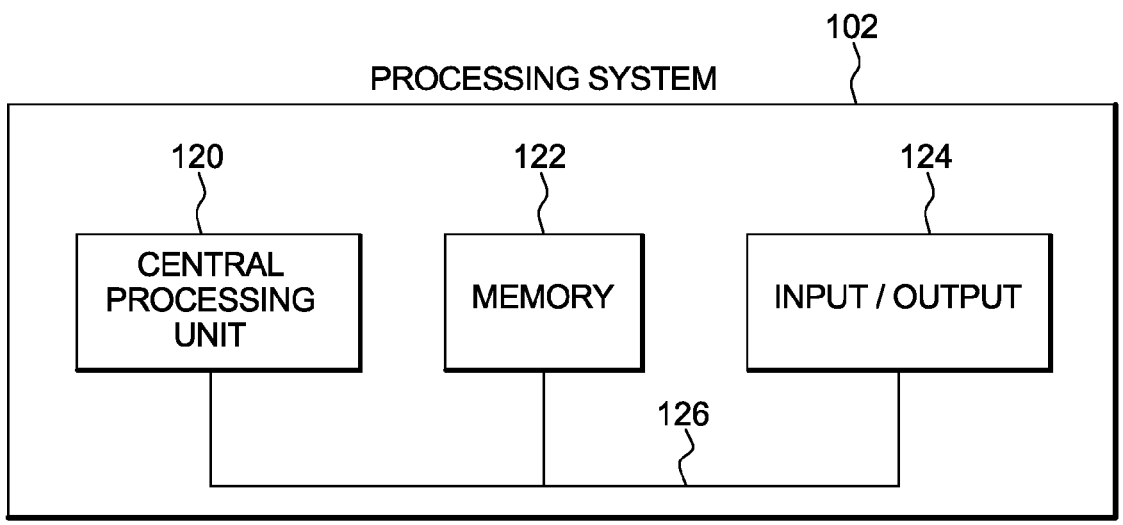
FIG. 1B depicts one example of a processing system of the hybrid computing system of FIG. 1A, in accordance with an aspect of the present invention.

Processing system 102 is, for instance, a zEnterprise™ 196 (z196) system offered by International Business Machines Corporation, Armonk, N.Y. It is optimized to host large-scale database, transaction, and mission critical applications. As depicted in FIG. 1B, it includes, for instance, one or more processors (CPUs) 120, one or more of which execute an operating system, such as the z/OS® operating system offered by International Business Machines Corporation, Armonk, N.Y.; memory 122; and one or more I/O devices/interfaces 124 coupled to one another via one or more buses 126. A hybrid system may include one or more processing systems, and each processing system may have the same or different components than another processing system.

Blade extension 104 includes one or more blade center racks, and each rack has one or more blade center chassis (e.g., a BladeCenter® H Chassis offered by International Business Machines Corporation). Each chassis is a physical structure into which one or more blades (e.g., up to 14 blades per chassis) are plugged and each provides certain management functions for its blades. In one example, blade extension 104 includes at least one chassis having POWER7™ blades and System x® blades, both of which are offered by International Business Machines Corporation, and together enable execution of AIX®, Linux and Windows® applications, as examples. (BladeCenter®, z/OS®, System x®, and AIX® are registered trademarks of International Business Machines Corporation. Windows® is a registered trademark of Microsoft Corporation, Redmond, Wash.) The chassis further includes high performance optimizers and special-purpose appliances used to extend the function of the system, improve performance, and reduce the cost of running and managing the business service workloads. In one example, the blade extension is a zEnterprise Blade Center Extension (zBX) offered by International Business Machines Corporation. Further details regarding components of blade extension 104 are described with reference to FIG. 1C.

Figure 1C:
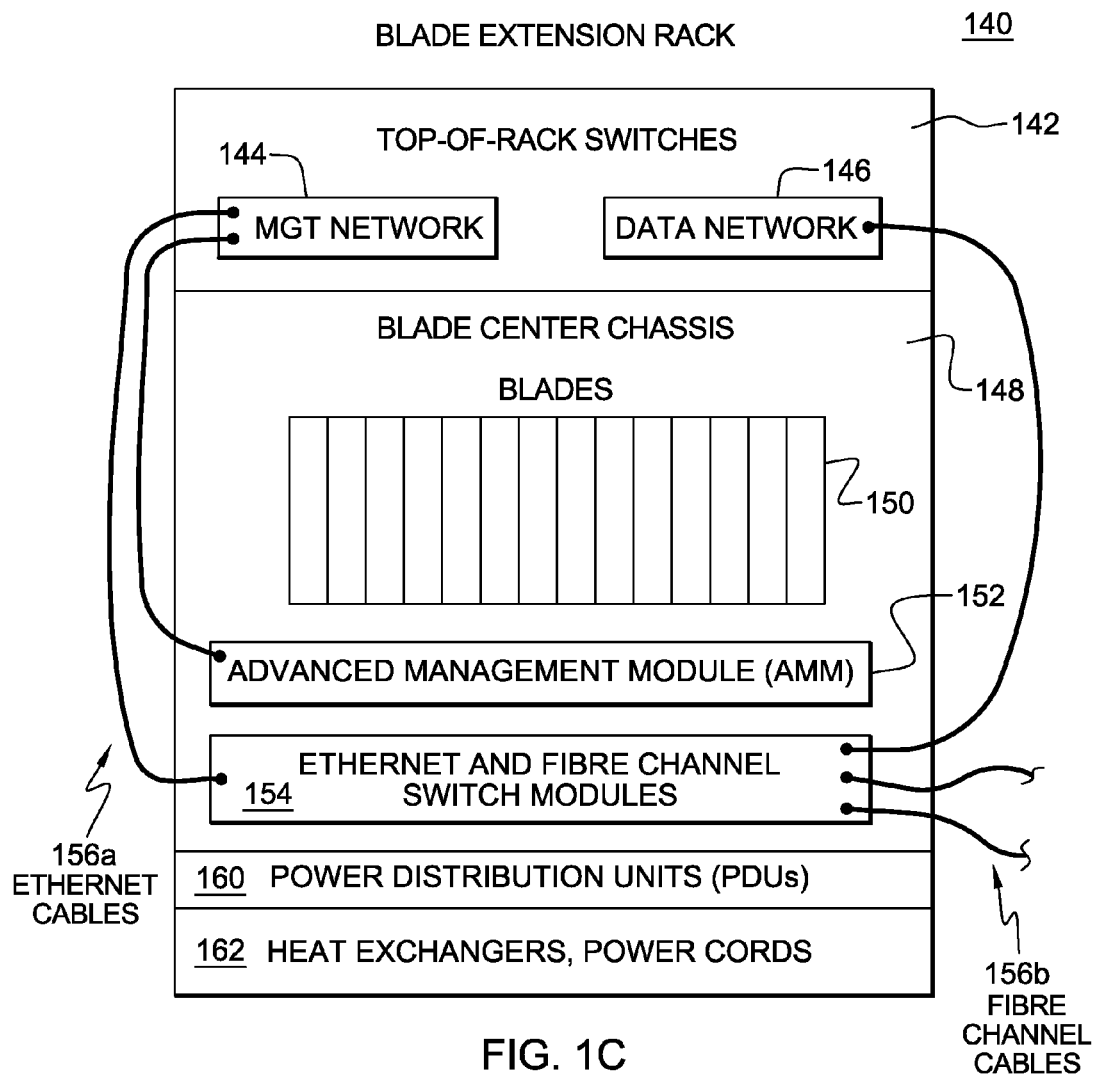
FIG. 1C depicts one example of a blade center rack of a blade extension of the hybrid computing system of FIG. 1A, in accordance with an aspect of the present invention.

Referring to FIG. 1C, one rack 140 of blade extension 104 is described. In this example, blade center rack 140 includes top-of-rack network switches 142 (e.g., ethernet network switches), including, for instance, a management network switch 144 having one or more management network ports and a data network switch 146 having one or more data network ports, described more fully below; one or more blade center chassis 148, each having one or more removable blades 150 installed therein (e.g., up to 14 blades per chassis), an advanced management module (AMM) 152 for each chassis, and one or more switch modules 154, including, for instance, an ethernet switch module (ESM) and a fibre channel switch module; one or more ethernet cables 156A coupling the management network ports to AMM 152 and switch modules 154, and coupling the data network ports to switch modules 154; one or more fibre channel cables 156b for connecting externally to, for instance, a storage area network (SAN); one or more power distribution units (PDUs) 160; and other optional components 162, including, for instance, a heat exchanger, power cords, etc. Many of the blade center rack components are described in further detail below. Further, a rack may have more, less or different components than described herein, and one rack may be the same as or different from another rack.

In one example, a blade 150 of blade center chassis 148 may be, for instance, a POWER® blade or a System x® blade, and on a blade are processor, memory and I/O resources of a particular architecture. In one example, the blade may be used as a general-purpose host for customer application software running in a virtualized environment, and as other examples, a blade may be used to provide a special-purpose workload optimizer or accelerator, such as the Smart Analytics Optimizer (SAO) or DataPower® appliance, offered by International Business Machines Corporation, Armonk, N.Y. The customer selects the role that each of the blades play. Once installed, however, it is managed under a single point of control (e.g., System z® Unified Resource Manager firmware, described herein). Power® and DataPower® are registered trademarks of International Business Machines Corporation.

Figure 1D:
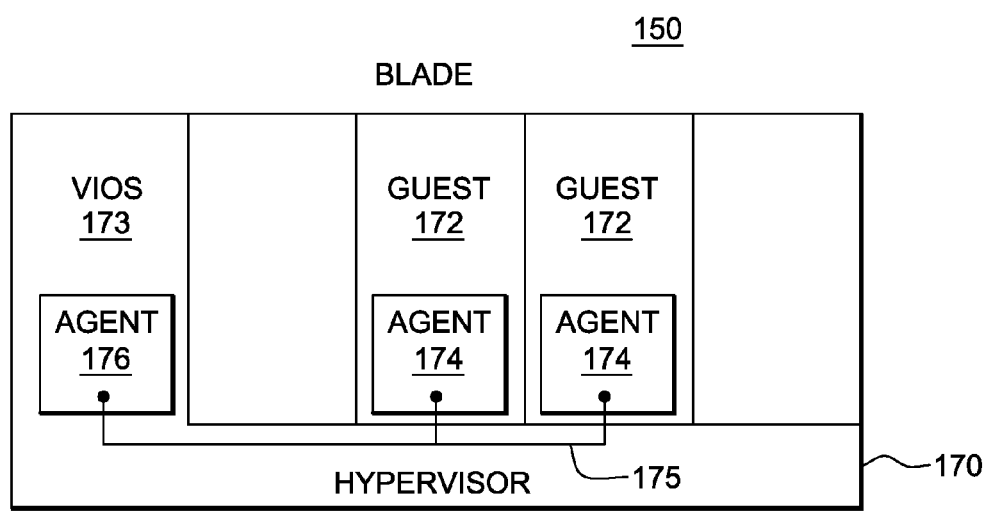
FIG. 1D depicts one example of a blade of the blade center rack of FIG. 1C, in accordance with an aspect of the present invention.

Further details regarding a general-purpose engine blade, such as a POWER® blade, are described with reference to FIG. 1D. In this example, blade 150 includes a hypervisor 170, and one or more virtual servers 172. Hypervisor 170 is, for instance, a POWER® hypervisor, pHYP, and includes firmware that runs on the blade. The hypervisor is delivered and managed as firmware (e.g., System z® firmware) and installed on the blade for the customer. Thus, it is loaded without any direct customer responsibility for installation, service or configuration (i.e., the process is automated and the customer does not need the installation media or to perform steps to, e.g., install the hypervisor.).

Additionally, the blade includes a virtual partition that executes a virtual I/O server (VIOS) 173. Physically, VIOS is a virtual server hosted on the blade and virtualized by the hypervisor. However, in accordance with an aspect of the present invention, firmware of the controlling architecture (e.g., System z® Unified Resource Manager firmware) is installed within the VIOS to allow monitoring and management of the hypervisor and blade by the Unified Resource Manager (agent 176, described below, is an example of such firmware).

Each virtual server 172 executes, for instance, an AIX® operating system, and included as part of the operating system is a Unified Resource Manager agent 174. In one example, agent 174 is a guest platform management provider, which is a set of firmware code delivered as part of the Unified Resource Manager. For instance, the agent is deployed as an installation CD/DVD image from the support element onto the blade, and then the guests mount this CD/DVD image in a virtual drive to allow the agents to be installed by the guest operating system into their image. These agents have a connection 175 to another agent 176 located in the VIOS, referred to as a hypervisor performance manager. Agent 176 is then connected to the management network of the hybrid computing system, which is described below. Thus, the support element of the processing system (described below) is able to communicate with the VIOS, which is considered part of the hypervisor running on the blade. Using this communication path the support element has to agent 176 in the VIOS and the connection between agent 176 and agent 174 installed in the virtual server, the support element is also able to indirectly communicate with agent 174 in the virtual server.

Returning to FIG. 1A, processing system 102 and blade extension 104 are managed by Unified Resource Manager (URM) 110, which provides federation, management and control of the diverse resources within the hybrid system. It includes firmware that is installed on the processing system and the blade extension, and possibly in other controllers, if used. It includes the firmware that is installed on the hardware management console and support element (i.e., the firmware that runs on those elements is considered part of URM). It is used to logically integrate and manage the hypervisors of the various systems, as well as to integrate and manage the workload optimizer and accelerators that may also be present in the blade extension. It provides platform, hardware and workload-aware resource management. Firmware, as defined herein, includes, e.g., the microcode, millicode and/or macrocode delivered with and hosted in any component of the system. It includes, for instance, management function delivered as a integral part of a support element (described below) and as an integral part of a hardware management console (described below), as well a management function delivered and installed by the support element and the hardware management console on the blades. Any function or programming that is installed onto the blades (e.g., hypervisor, agents, control function, etc.) by the support element is firmware.

The Unified Resource Manager provides, for instance, workload-based resource allocation and provisioning for the hybrid system. It provides physical and virtual server, network, and storage resource management. It is a service goal-oriented resource manager, optimizing the use of the resources in accordance with, for instance, a user supplied availability, performance, energy, and/or security management policy. It provides ensemble network and storage management, configuration management for the hardware/firmware, operation controls for the hardware/firmware, and service and support for the hardware/firmware. In one particular example, the firmware of the Unified Resource Manager is zEnterprise™ (or System z) firmware allowing the URM to provide goal oriented quality of service optimization for the resources used in the service of the business applications hosted on the hybrid system.

Further details regarding hybrid system 100 are described with reference to FIG. 2A. In this example, hybrid system 100 includes processing system 102 coupled to blade extension 104 via a private data network (IEDN) 200 and a management network 201, each of which is described below. Processing system 102 includes, for instance, one or more central processing units (e.g., z CPUs) 204, memory 206, and input/output devices/interfaces 208. The one or more central processing units execute a plurality of operating systems, including z/OS® 210 and Linux 212, as examples. Further, processing system 102 includes a plurality of hypervisors, including z/VM® 216, which manages the virtual servers running within a single logical partition and executing Linux operating systems in this example; and PR/SM® 218, which is firmware based and manages logical partitions (LPARs), which are virtual servers running as first level virtual servers, and executing z/OS® operating systems in this example. PR/SM® and z/VM® are offered by International Business Machines Corporation, Armonk, N.Y., and are registered trademarks of International Business Machines Corporation. In one example, processing system 102 is a zEnterprise™ z196 System (a.k.a., a zEnterprise™ node) offered by International Business Machines Corporation, Armonk, N.Y.

Processing system 102 also includes a support element (SE) 219 that is used in managing the hybrid system and storing state for the system. The support element has the responsibility for, for instance, knowing dependencies within the hybrid system, the various component levels across the system, updating the system, etc. It uses a management network (described below) to deliver firmware updates, to ensure the dependencies and co-requisites for the firmware being applied is compatible, and to drive the mechanisms through the management network to perform the updates, understanding that the firmware may be in multiple parts of the hybrid system. In one example, support element 219 includes an operating system, runtime code and one or more services (e.g., monitoring, as well as others).

Blade extension 104 includes one or more blade center chassis 148, and each chassis includes a plurality of blades dedicated to specific purposes. For instance, in this particular example, there are x86 blades 220 running the Linux operating system 222 and virtualized by a xHYP hypervisor 224; POWER® blades 226 running the AIX® operating system 228 and virtualized by a pHYP hypervisor 230 (e.g., Power VM™ offered by International Business Machines Corporation); as well as other specialty blades, such as a Smart Analytics Optimizer (ISAO) 232, and others 234 (e.g., High Performance Computing (HPC), DataPower® (DP)). The blades described herein are just examples; there may be more, less and/or different blades without departing from the spirit of the present invention.

Figure 2B:
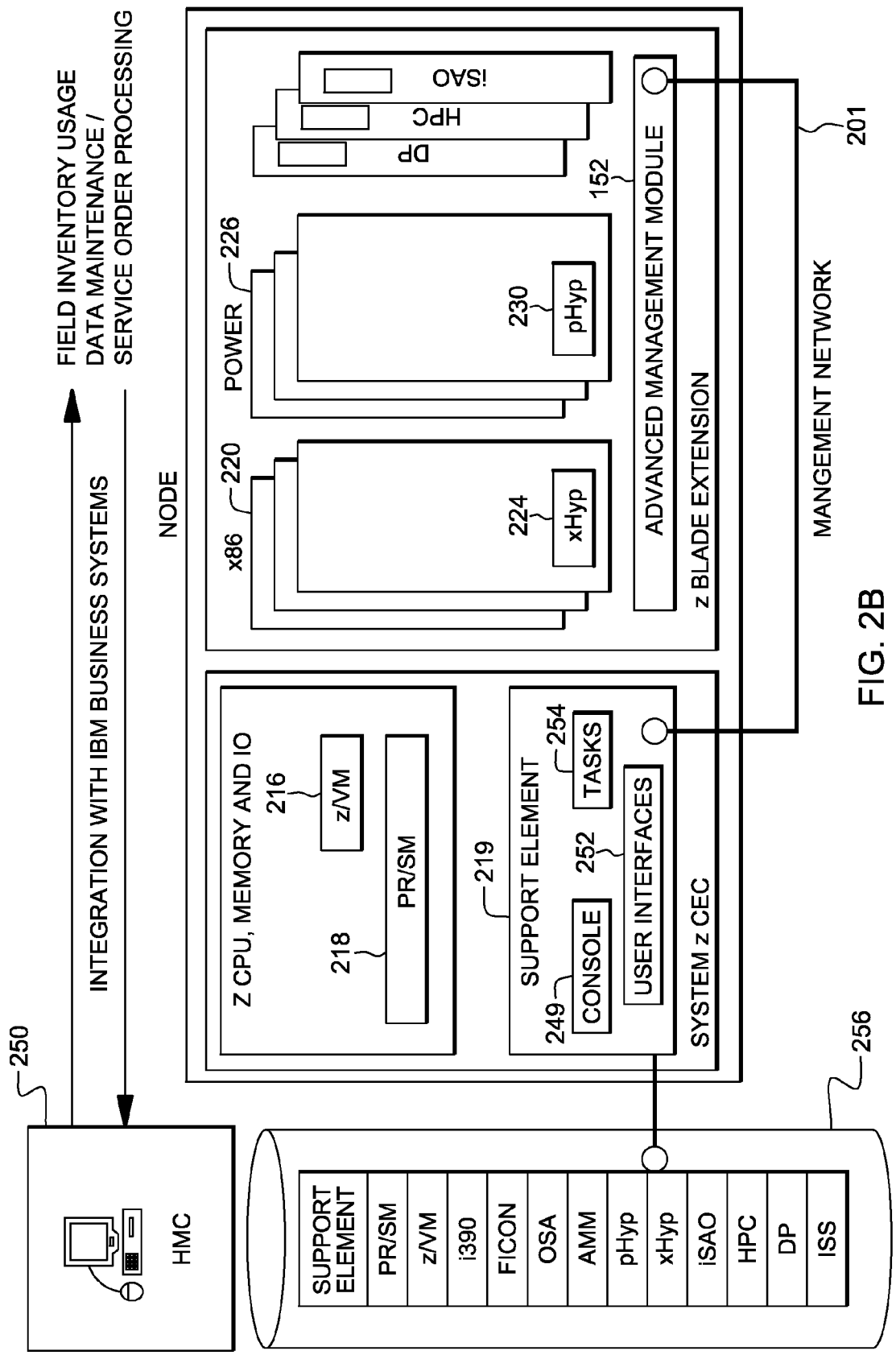
FIG. 2B depicts further details of a support element of the hybrid computing system of FIG. 2A, in accordance with an aspect of the present invention.

When the blades are plugged into the chassis, a management component 152 located within the blade center chassis, referred to as the Advanced Management Module (AMM), learns of their identities and addresses. For example, the AMM discovers the information by executing a routine to obtain the information or it is provided the information, responsive to the blades being added. The AMM is a set of functions that provide a hardware management interface for the blade-based resources that are located within a blade center chassis. The AMM is the path through the blade hardware used to perform hardware operational controls and to obtain access to hardware diagnostic data and service data. It is used, for instance, to power the blades on/off, etc. It is configured such that only the Unified Resource Manager firmware communicates with the AMM. As shown in FIG. 2A, there is a management connection between AMM 152 and support element 219. Further details regarding support element 219 are described with reference to FIG. 2B.

As shown in FIG. 2B, support element 219 includes a plurality of components, including, for instance, a console 249, one or more graphical user interfaces 252, one or more tasks 254 running thereon, and storage 256. Storage 256 includes the firmware for the system, including the firmware for the various hypervisors (e.g., PR/SM®, z/VM® pHYP and xHYP); the processors (e.g., i390); communications (e.g., FICON, OSA); management (e.g., AMM); and the optimizers/accelerators (e.g., iSAO (Smart Analytics Optimizer), HPC (High Performance Computing), DP (DataPower®)), in this particular example. The management and control functions of the support element are, in one embodiment, implemented via programming that is delivered as System z® firmware. That is, in this embodiment, the support element function is delivered as hardware and firmware and not customer-installed or managed software.

The support element is communicatively coupled to the AMM via a distinct management network, and thus, the support element and AMM communicate with one another to have certain tasks performed. For instance, when a hardware management task is to be directed to a blade, in accordance with an aspect of the present invention, it is forwarded from the support element over the management network (described more fully below) to the AMM, which performs the task. For instance, if a particular blade is to be turned on, a user selects from the user console on the support element the blade to be turned on, the support element informs the AMM via the management network that the blade is to be turned on, and then the AMM turns on the blade in a standard manner. A response may then be sent from the AMM back to the support element over the management network indicating the status (e.g., success, failure) of the power on command. (In another embodiment, the user console is on a hardware management console (described below) coupled to the support element.)

The same network and logic may be used to communicate with the AMM to perform other tasks, such as monitoring the capabilities or performance of the hardware (e.g., how much energy is it using; how hot is it; is it working correctly; is it recording failures; etc.), and/or to receive alerts.

In this particular example, hybrid system 100 also includes a hardware management console (HMC) 250. A shown in FIG. 2A, HMC 250 is coupled to support element 219 via an external management network 251, described below. In one example, the HMC is part of a multi-tiered structure in which the HMC pushes control down to a second tier that includes the support element, and then the support element takes responsibility for the resources at a node level and pushes control down on those resources within that node. The HMC may be used in a single system, a hybrid system, or for instance, to integrate a plurality of hybrid systems into an ensemble, as shown in FIG. 3.

Figure 3:
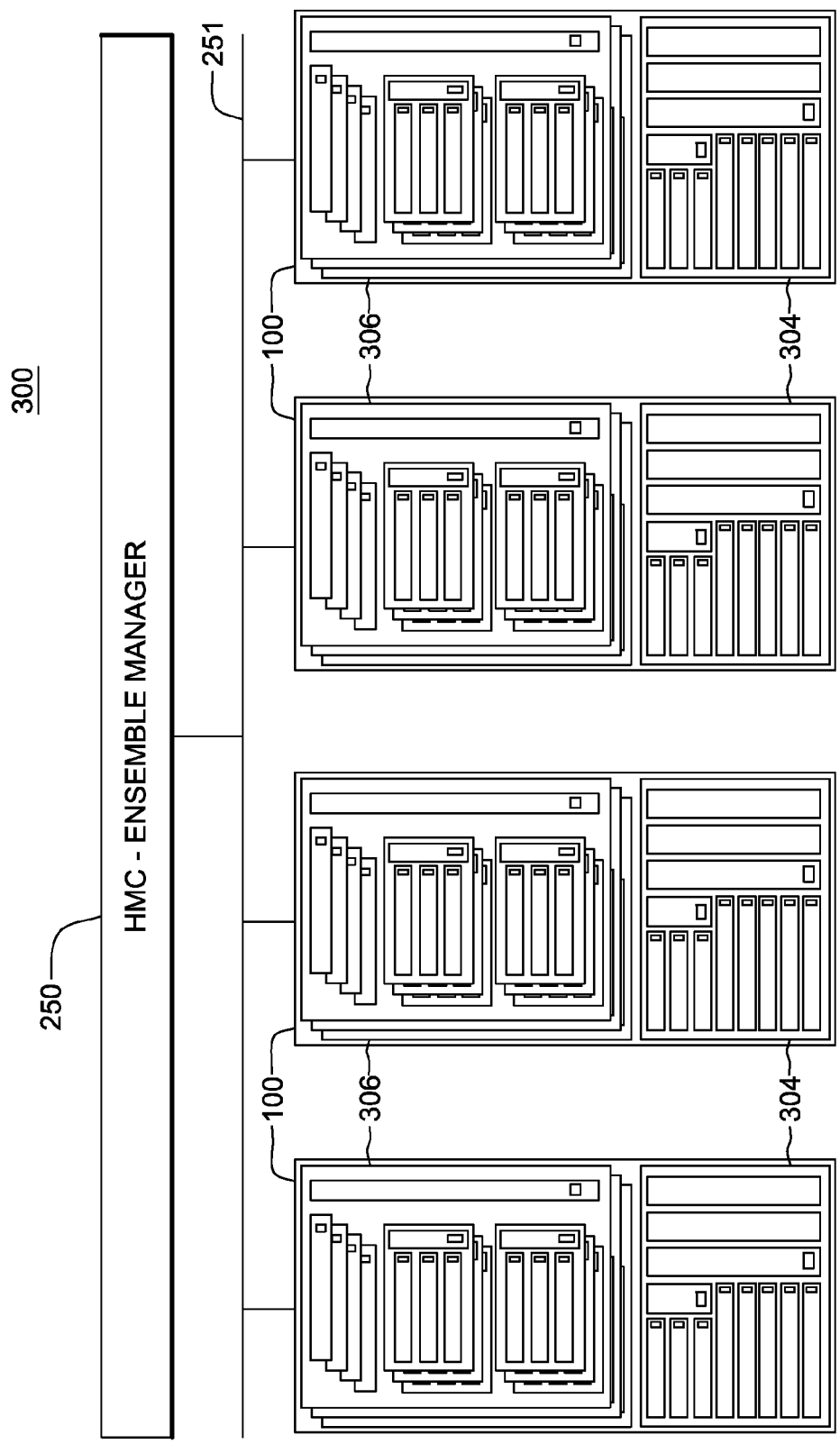
FIG. 3 depicts one example of an ensemble that includes a plurality of hybrid computing systems, in accordance with an aspect of the present invention.

As depicted in FIG. 3, in one particular example, an ensemble 300 includes a plurality of hybrid systems 100 managed by HMC 250. In one particular example, ensemble 300 is a zEnterprise™ ensemble, and the hybrid systems are zEnterprise™ nodes managed as a single virtualized pool of server resources. In this particular example, each zEnterprise™ node includes a hybrid system having a single z196 CEC 304 with an attached zBX containing 1 to 4 racks 306 with up to 2 blade center chassis per rack. The ensemble includes integrated advanced virtualization management, virtual resource management and optimization, and implements a well-defined external interface to data center service management functions. In a further example, the ensemble may include one or more nodes (even all) that are not hybrid systems (e.g., no racks), but instead, just processing systems, as examples.

Figure 4:
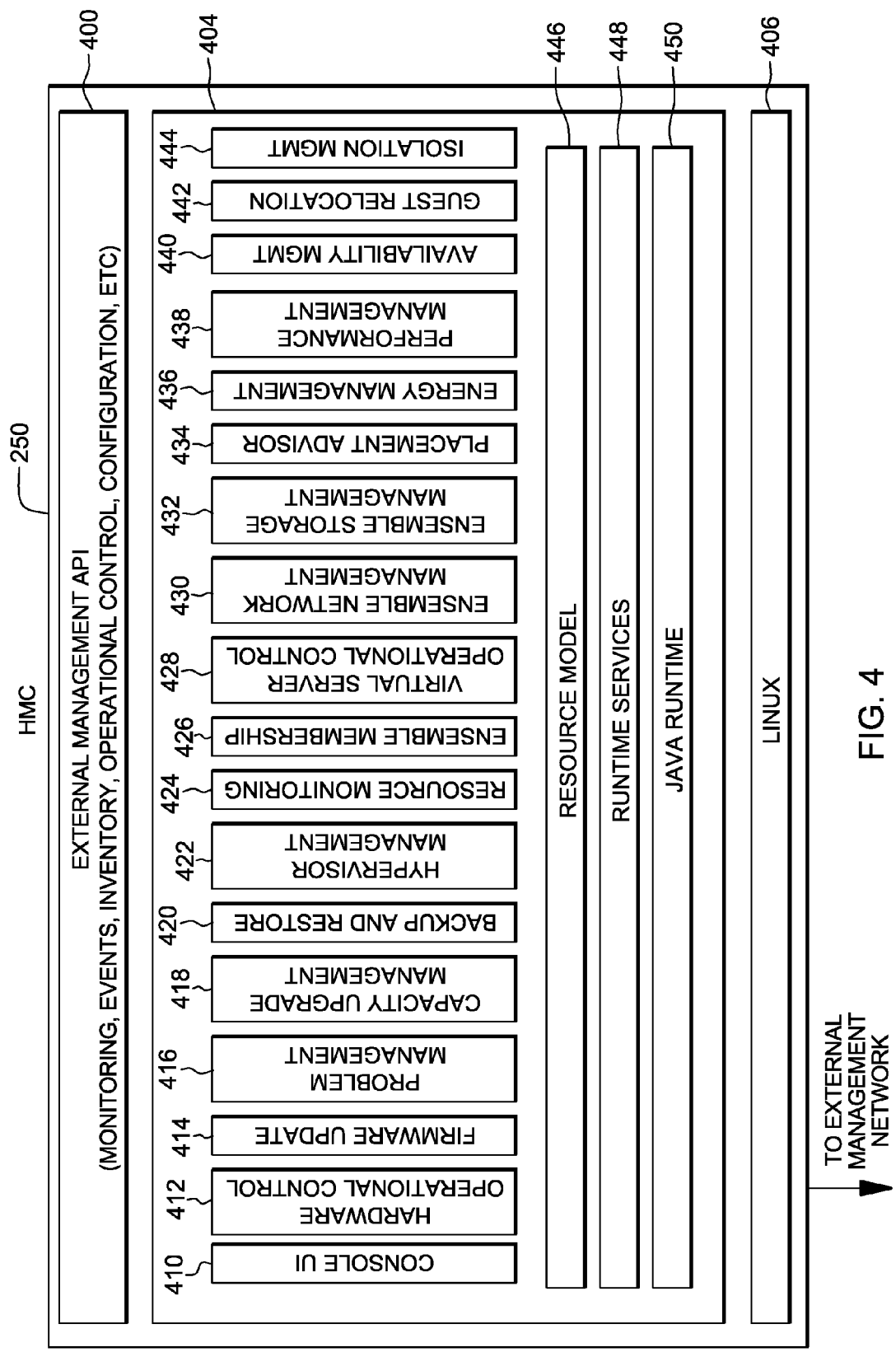
FIG. 4 depicts one example of a hardware management console used to manage the ensemble of FIG. 3, in accordance with an aspect of the present invention.

Further details regarding one embodiment of HMC 250 are described with reference to FIG. 4. In one example, HMC 250 is delivered as hardware and firmware (e.g., System z® firmware) and not customer-installed or managed software. It is, in one particular example, a zHMC platform management appliance, which includes, for instance, an external management application programming interface (API) 400 used for monitoring, events, inventory management, operational control, configuration, etc.; various services 404, generally including interfaces, controls, management, etc.; and an operating system 406 (e.g., Linux). As examples, services 404 include a console user interface 410, hardware operational control 412, firmware update 414, problem management 416, capacity upgrade management 418, backup and restore 420, hypervisor management 422, resource monitoring 424, ensemble membership 426, virtual server operational control 428, ensemble network management 430, ensemble storage management 432, placement advisor 434, energy management 436, performance management 438, availability management 440, guest relocation 442, isolation management 444, resource model 446, runtime services 448, and runtime code 450 (e.g., JAVA).

In one example, external management API 400 provides a programmatic interface to other management applications acting as a management access point. This management access point provides, for instance:

Manager (e.g., zManager) Management function implemented in HMC, SE, hypervisors, OS agents;

External management interaction (e.g., all the interaction) with the system is enabled through the Manager interface;

The Manager interface may be CIM, SNMP, Rest, etc. The interface may express zEnterprise™ specific and proprietary function, protocols, models, etc.

Provides a Console UI to provide access to zEnterprise™ specific functions, and to provide console function when no higher level enterprise console is used;

Implements Manager ensemble management functions and publishes the interfaces to those functions in the HMC;

Provides instrumentation and events related to resource utilization, capacity, problem, performance, energy, and availability in the context of the deployed workloads;

Implements the provisioning of virtual resources and makes the function accessible through the Manager Interface;

Implements the instantiation and modification of workload definitions and associated service level policies and makes the function accessible through the Manager interfaces;

Publishes interfaces to provide platform resource inventory, configuration, and deployment information necessary to facilitate data center view of deployed resource inventories, and virtual system configurations;

Implements dynamic resource monitoring capabilities within the ensemble, and provides instrumented data through the Manager Interface;

Implements both directed and ensemble assisted resource provisioning and deployment actions and publishes these interfaces through the Manager; and Implements placement advise intended to dynamically determine best target location for the resource provisioning.

Although the above describes examples for z/Enterprise™, one or more aspects of the present invention are not limited to such a platform or architecture.

As previously mentioned, in accordance with one or more aspects of the present invention, there are a plurality of networks within the hybrid system, including, for instance, a management network and a data network. The management network provides connections to components enabling the components to be managed by firmware (i.e., System z® firmware) and is not accessible by customer-deployed software hosted in the hybrid system. The data network, however, is accessible, and intended for use by customer-deployed software hosted on the hybrid system. The physical networks are largely pre-configured and pre-wired. For the data network, a secure, private high-speed ethernet network is provided that is standard in how it is used by the customer-deployed software, but not standard in how it is managed and controlled (i.e., it is managed and controlled by URM firmware and not customer network management tools). In accordance with an aspect of the present invention, the management network and data network are managed by the Unified Resource Management firmware. The management and data networks are dedicated and physically isolated so that they are protected, serviced and managed by the firmware (e.g., System z® firmware). The management network connects the physical and virtual hardware together enabling the URM to manage the diverse compute components of the hybrid system as one logical entity. Further details regarding the management network and the data network, as well as other networks of the hybrid system, are described with reference to FIG. 5.

Figure 5:
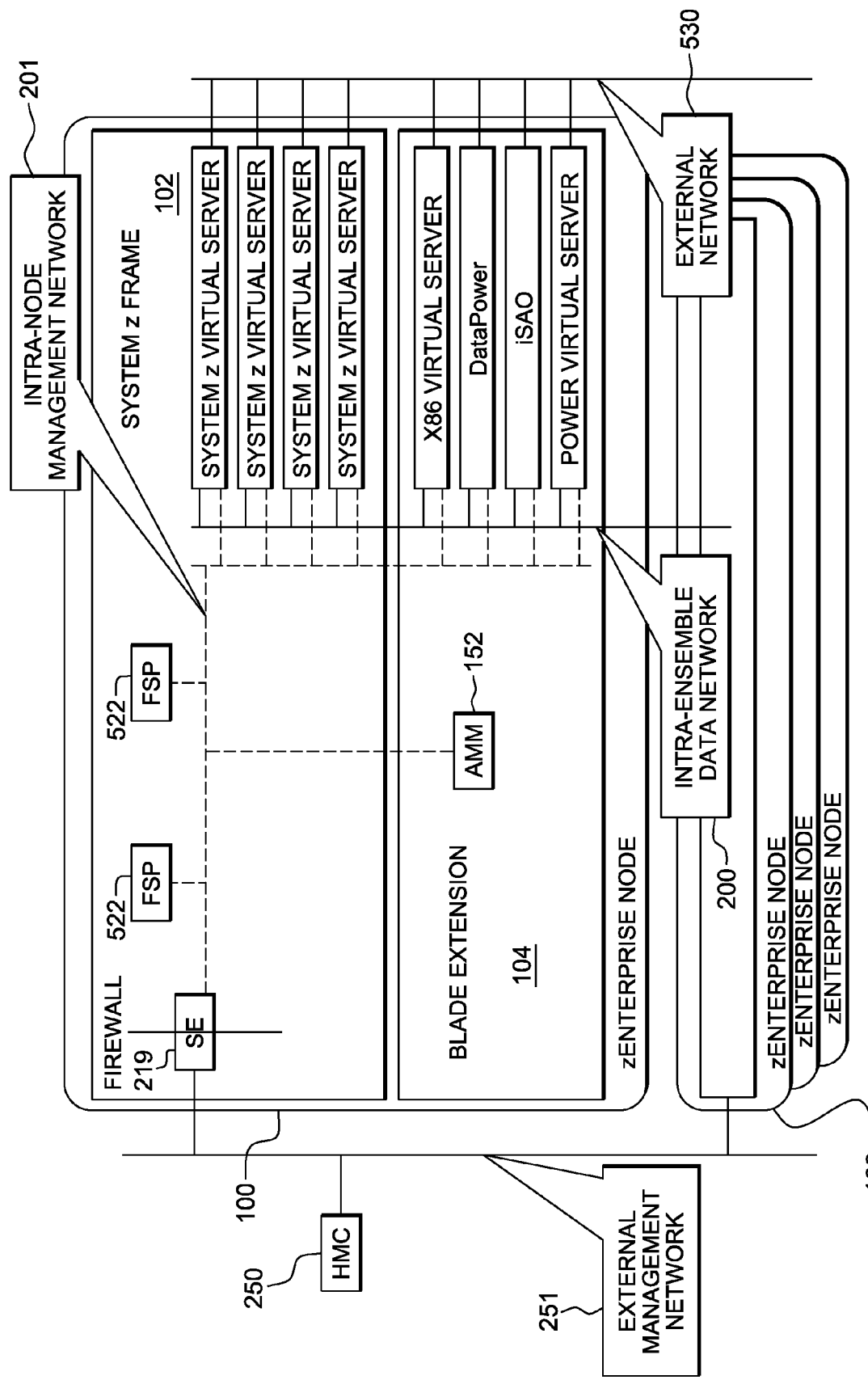
FIG. 5 depicts examples of networking used in accordance with one or more aspects of the present invention.

Referring to FIG. 5, a management network 201 (also referred to herein as the intra-node management network) includes connections from support element 219 (e.g., through a bulk power hub (BPH) within processing system 102, which acts like an Ethernet switch) to other components (e.g., virtual servers) within processing system 102, as well as components (e.g., virtual servers, optimizers, appliances) in blade extension 104 (see dotted line). This management network is owned and controlled by the firmware. It is not accessible by the customer-deployed software. Included on the management network are other processors 522, such as Flexible Service Processors (FSPs), and an advanced management module (AMM) 152.

The data network, also referred to herein as an intra-ensemble data network 200 (IEDN), connects, for instance, components (e.g., virtual servers) within processing system 102 with components (e.g., virtual servers, appliances, optimizers) of blade extension 104. Further, in other examples, it connects processing systems to other processing systems, and blades to other blades. The fabric physically allows for connectivity between any processing systems and blades to any other processing systems and blades. This network is ensemble wide, in which the ensemble includes, for instance, a plurality of hybrid systems 100, and the network is used for customer data.

In addition to the intra-node management network and the intra-ensemble data network, in one embodiment, there is an external network 530 providing external connections from components of processing system 102 and blade extension 104; and an external management network 251 that connects HMC 250 to the support elements of the ensemble. Further details regarding various connections of the networks are described below.

In accordance with an aspect of the present invention, there are separate isolated physical networks for the intra-node management network and the intra-node data network. Each separate network includes, for instance, switches, adapters, Network Interface Cards (NICs), cables, etc. In this example, these two networks are two distinct and isolated physical networks.

Figure 6:
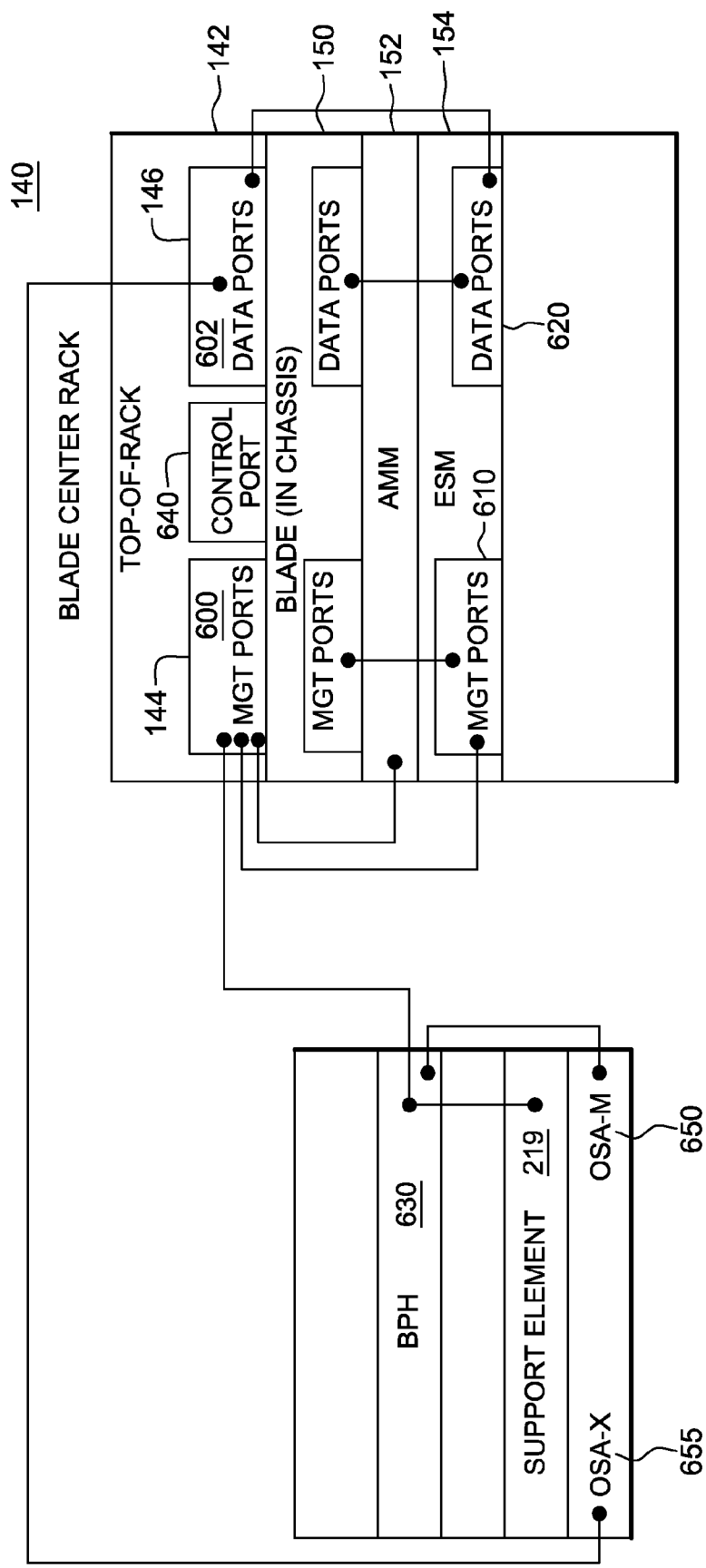
FIG. 6 depicts example connections used in accordance with one or more aspects of the present invention.

As one example, as shown in FIG. 6, in blade center rack 140, there are top-of-rack (TOR) switches 142 including, for instance, a management network switch 144 having one or more management ports 600 and a data network switch 146 having one or more data ports 602. As an example, the TOR switch that includes the management ports is a 1 Gigabyte switch, and the TOR switch that includes the data ports is a 10 Gigabyte switch. (In another embodiment, one switch includes both the management ports and the data ports; further there may be multiple switches for redundancy.) Similarly, the Ethernet Switch Module (ESM) 154 also includes management ports 610 and data ports 620. The management ports are used for the management network, and the data ports are used for customer applications.

In one example, for the management network, one management port 600 is connected to a port in AMM 152, one management port 600 is connected to a management port 610 in ESM 154, and another management port 600 is connected to processing system 102. (In other examples, multiple connections between the aforementioned ports may be provided for redundancy.) In one particular example, a management port 600 is connected to a port in a bulk power hub (BPH) 630, which is connected to a port in support element 219 of the processing system. Further, in the processing system, there are one or more ports of one or more network adapters (e.g., an Open Systems Adapters (OSA)) designated for the management network, referred to as OSA-M ports 650, which are connected to a management port in the BPH to enable the processing system (e.g., CEC) to be connected on the management network to the local support element. Logical partitions or systems on the processing system gain access to the management network through OSA-M. These connections are pre-configured.

In a further example, for the data network, the processing system also includes one or more designated OSA-X ports 655 of one or more OSA adapters used to provide network connectivity for the customer-deployed software. These ports are part of the IEDN used by customers. The OSA-X ports, unlike the OSA-M management ports, do not flow through the BPH. Further, the support element is not on the IEDN. The OSA-X ports are isolated from the traditional general-purpose network connections.

In the blade center rack, in one example, the data network switches are physically different and isolated from the management network switches. In one example, OSA-X is connected to data ports 602 of the Top-Of-Rack switches in the rack. Further, data ports 602 are coupled to data ports 620. Through appropriate configuration of the hypervisors by the URM firmware, these data ports are further connected to a virtual switch in the hypervisor on a blade, thereby connecting the virtual server guests on the blade.

The IEDN provides physical any-to-any connectivity across any blade and any processor in the ensemble. The data network switches (e.g., the 10 Gigabyte TOR switches) have ports to connect to multiple processing systems, as well as to other Top-of-Rack Switches. The URM then provides the means to provision virtual LAN segments over this physical IEDN network.

The physical configuration of the networks and the pre-configuring and pre-wiring of the physical connections removes the responsibility from the user of configuring the physical networks, cabling, assigning port numbers, etc.

In addition to the above, in one embodiment, each top-of-rack switch 142 includes a management control port 640, which is used to configure its associated TOR switch (e.g., on/off; available for management/data; etc.). The control port is connected to the management network, and part of the function of the Unified Resource Manager is to interact with the physical TOR switch over the control port and to configure it. Part of the function of the URM is to be the exclusive manager of the control ports of the TOR switches.

In further embodiments, there may be multiple TOR switches, AMMs, and ESMs and/or other switches/components for redundancy.

In accordance with an aspect of the present invention, configuration state of the hybrid system is maintained in storage of support element 219. In particular, the support element has an understanding of the resource inventory of the hybrid system. Thus, in one example, responsive to a blade center chassis being installed, and in particular, the AMM of that blade center chassis, certain hardware discovery is performed by the support element. One example of this discovery is described with reference to FIG. 7.

Figure 7:
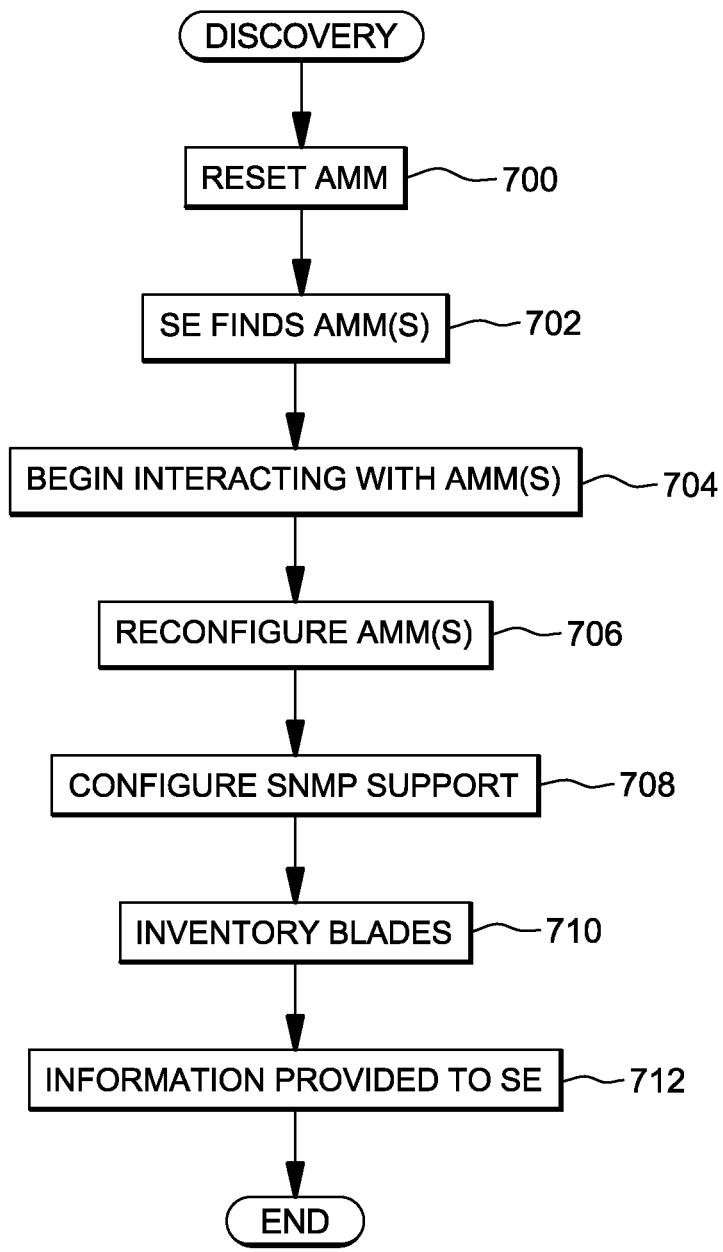
FIG. 7 depicts one embodiment of the logic used to discover blades of a hybrid computing system, in accordance with an aspect of the present invention.

Referring to FIG. 7, responsive to a customer engineer installing a blade center chassis and the advanced management module for that chassis, a reset of the AMM is initiated, either manually by the engineer or programmatically, STEP 700. The reset initializes the AMM to its default state. In this default state, an initial pre-defined default userid and password may be used to log into a secure shell (SSH) session on the AMM to make management task requests, and to initiate the configuration of default network addressing.

The support element learns of the installation of the AMM via, for instance, a broadcast from the AMM over the management network, STEP 702. For instance, the support element uses the service location protocol (SLP) to listen over the management network for the broadcast. Responsive to learning of the installation, the support element begins to interact with the AMM using a command line interface, STEP 704. This interaction includes establishing SSH sessions and reconfiguring the AMM so that access to its management functions is prevented from any component other than the support element. In other words, the default security context for the AMM is replaced to ensure access only from the authorized support element to ensure the support element has exclusive control over the configuration of the AMM, STEP 706.

Additionally, the support element establishes Simple Network Management Protocol (SNMP) support on the AMM in order for the support element to be an SNMP trap listener to learn of other installations, e.g., of blades, etc., STEP 708.

Thereafter, through AMM commands, the support element inventories the blades that are plugged into the blade extension, STEP 710, and this information is provided to the support element, STEP 712.

Figure 8:
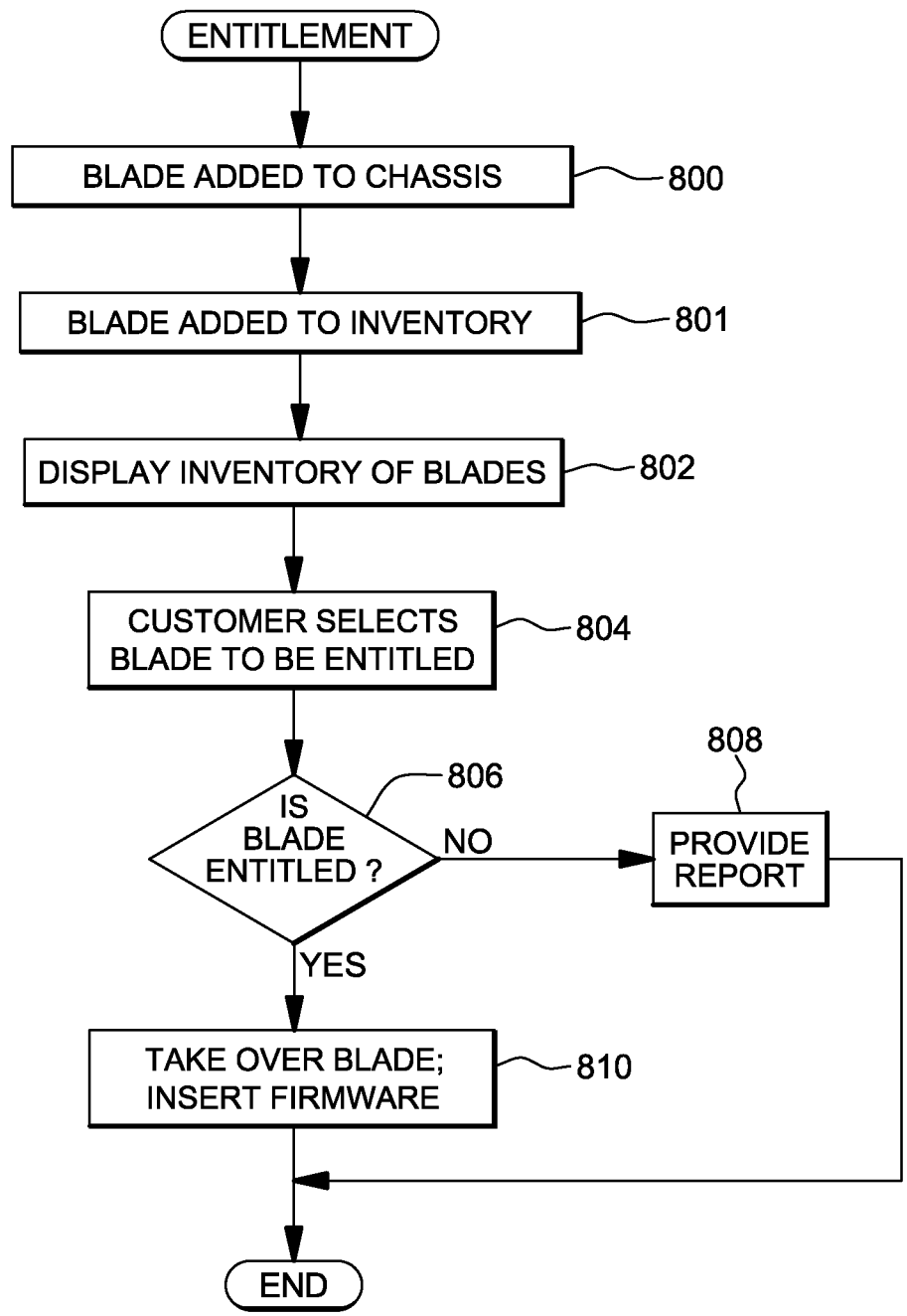
FIG. 8 depicts one embodiment of the logic to perform entitlement, in accordance with an aspect of the present invention.

In one example, prior to a blade being made available for use in a blade extension, an entitlement process is performed to determine whether there is authorization to use the blade. One example of this process is described with reference to FIG. 8. Initially, a blade is added to the chassis, which causes SNMP notifications to be sent to the support element and this notification makes the support element aware of the newly inserted blade, STEP 800. Responsive to these notifications, the support element records information about the newly inserted blade in its inventory of blades, but denotes that the blade is not yet available for use because the entitlement process authorizing its use has not yet been completed, STEP 801. Thereafter, to authorize the blade for use, an inventory of the available, but not yet authorized blades, is displayed on the console for the support element, STEP 802, and the customer selects the newly added blade that should be entitled for use, STEP 804.

Thereafter, a determination is made as to whether the blade is entitled to be made available for use, INQUIRY 806. For instance, in one particular example, a customer pays for a particular number of blades to be managed under control of the Unified Resource Manager. So, a decision is made as to whether the customer has exceeded the paid for allocation. If so, a report, such as an error report, is provided to the customer, STEP 808. Otherwise, the blade is entitled to be used. (There may be additional or different tests for entitlement.) The support element then accepts the blade as entitled, and initiates the process to configure the blade and to deploy the required Unified Resource Manager firmware on the blade, which may include the deployment and initialization of a hypervisor, STEP 810.

In one particular example, a portion of the firmware to be installed is a hypervisor on the blade. In accordance with an aspect of the present invention, the hypervisors to be used are shipped with the hybrid system, and stored on storage 256 (FIG. 2B) associated with the support element. Thus, the customers are relieved of the explicit responsibility for installing the hypervisors.

Figure 9:
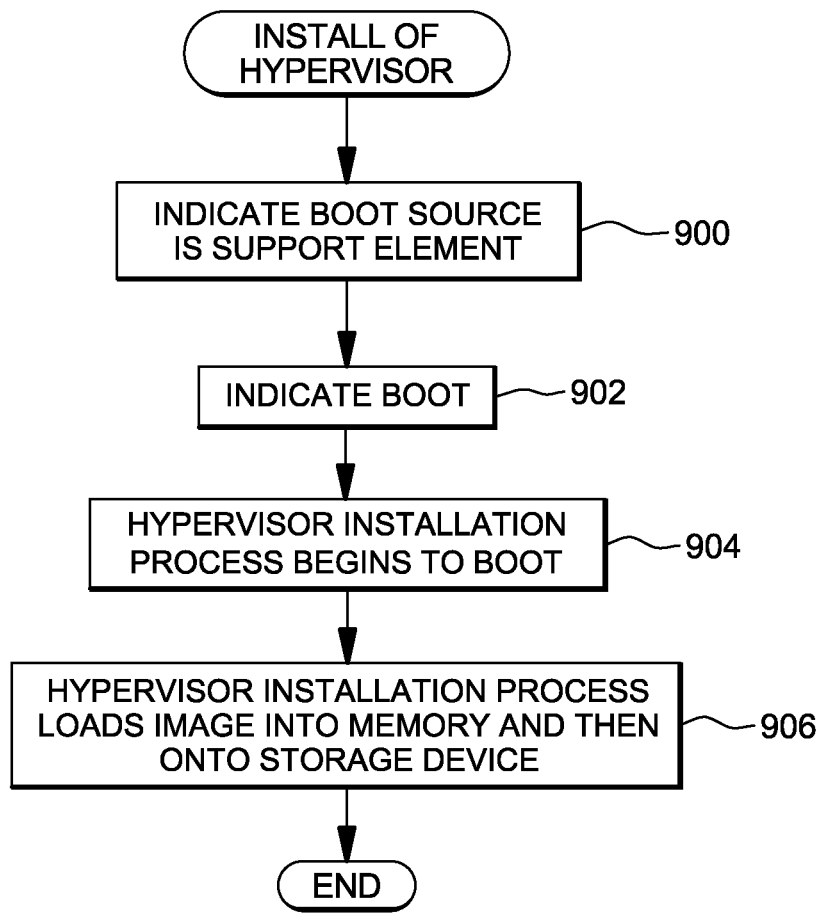
FIG. 9 depicts one embodiment of the logic to install hypervisors on blades, in accordance with an aspect of the present invention.

One embodiment of the logic used to install a hypervisor on a blade is described with reference to FIG. 9. Initially, the AMM of the blade center chassis containing the blade on which the hypervisor is to be installed obtains an indication from the support element that the hypervisor installation boot image for the hypervisor is to be obtained from the support element, STEP 900. Then, a command is sent from the support element to the AMM in the blade center chassis informing the AMM to initiate a boot of the hypervisor installation boot image from the support element by the selected blade, STEP 902. The hypervisor installation image begins to boot, STEP 904. This boot step begins the execution of the hypervisor installation process on the blade, which transfers the hypervisor installation image from the hard disk of the support element onto the local storage resident on the blade, STEP 906. At the completion of this process, the hypervisor is now installed on the local storage of the blade and can be booted from that storage by the Unified Resource Manager upon subsequent activation of the blade.

The supplying of the hypervisors from the support element provides encapsulation in that the support element supplies the firmware and other code that is to run natively on the blades. The support element is thus able to exclusively control the configuration (e.g., paging, etc.), function and operation of the blade. A pre-selected set of configuration decisions have been included with the firmware, relieving the customer from making those decisions. Further, the hypervisor is configured so that it only directly communicates across the management network. The hypervisor is configured so that it accepts management orders only from the support element that is connected to the management network.

Subsequent to installing the hypervisor, virtual servers may be provisioned thereon to enable customer work to be performed. A virtual server is comprised of an allocation of the required physical server resources, including, for instance, a number of CPUs (dedicated versus shared), memory, and I/O and network resources. To deploy a virtual server, a description of the virtual server resources is used by the Unified Resource Manager to create a virtual server on a specific hypervisor allocating the required platform resources. A bootable software disk image is copied to the storage resources bound to the virtual server and the virtual server is started from the bootable disk image.

Figure 10:
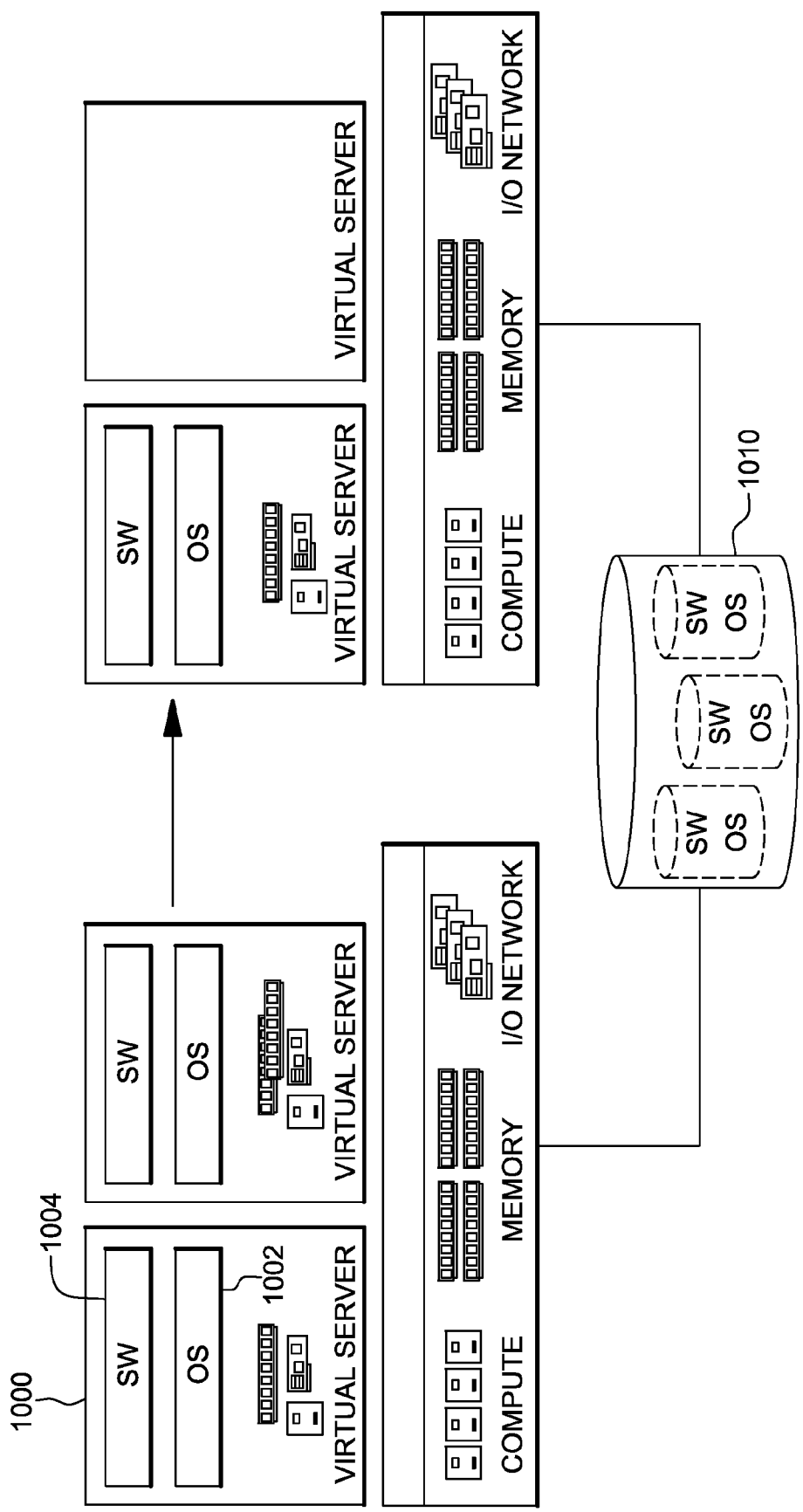
FIG. 10 depicts examples of virtual servers used in accordance with an aspect of the present invention.

Examples of virtual servers are depicted in FIG. 10. As shown, in one example, a virtual server 1000 hosts an operating system 1002, as well as various software 1004. The description of the virtual server composition is stored on disk 1010. Resource optimization and virtual server mobility is provided (as indicated by the arrow). Virtual server resource allocations may be dynamically adjusted allowing unallocated resources to be used by a virtual server, and allowing resource allocation adjustments to be made between virtual servers. Virtual server mobility between hypervisors is also provided in which resources are allocated on the target hypervisor; the virtual server in-memory state is moved to the target hypervisor and the resources on the source hypervisor are deallocated.

Figure 11:
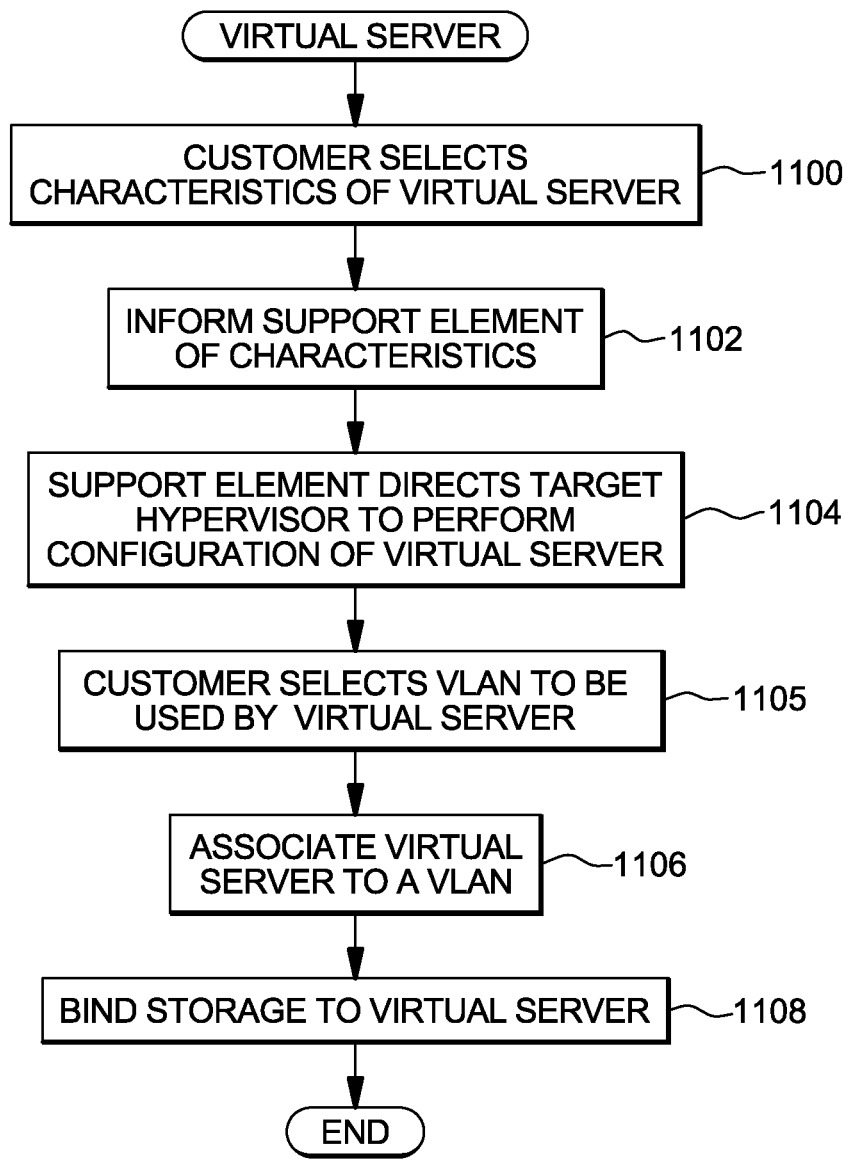
FIG. 11 depicts one embodiment of the logic to create a virtual server, in accordance with an aspect of the present invention.

Further details regarding deploying and instantiating a virtual server are described with reference to FIG. 11. By using the procedure described herein, the integrity and security of the system is maintained, since the customer is not allowed to make choices that are any more granular than the management model being followed or that violate security boundaries set up by the management model.

Initially, a customer selects the characteristics of the virtual server that is to be instantiated, STEP 1100. In one example, a wizard-type interface at the hardware management console is used by the customer to indicate the characteristics. (In other embodiments, programmatic interfaces of the HMC or user interfaces at the support elements may be used.) The characteristics include, for instance, the number of processors the virtual server is to have, an amount of memory for the virtual server, one or more available storage devices to be connected to the virtual server, a virtual local area network (VLAN) it is to have access to in terms of networking, and the hypervisor to host the virtual server. (In another embodiment, the hypervisor is not selected, but instead, the system dynamically selects it for the customer. This is also true for one or more other characteristics. Further, in another embodiment, the virtual server may have access to one or more VLANs.)

The hardware management console has a view of the computing environment (e.g., the aggregation of one or more hybrid systems of the ensemble) and understands the configuration of the computing environment, including the physical resources (e.g., machines, blades, network resources, etc.) and understands the network connections, as well as the storage devices accessible to the computing environment. The hardware management console has connectivity to the support element (via external management network 251 (FIG. 2A)) and understands that relationship and understands that the support element has secure management connectivity (via management network 201) to the blade on which the virtual server is to be deployed. Therefore, the hardware management console informs the support element of the selected characteristics, STEP 1102. The support element, and in particular, the Unified Resource Manager of the support element, uses the management network and directs the indicated hypervisor to perform a configuration step that results in the manifestation of the virtual server on that hypervisor, STEP 1104.

After defining the virtual server, user interfaces are provided on the hardware management console to allow the customer to select the VLAN (or VLANs) to be associated with the virtual server, STEP 1105. Responsive to the selections made by the customer, the Unified Resource Manager function of the support element is informed of the customer choice, and in response, uses the management network to cause the hypervisor to associate the virtual server with the chosen VLAN or VLANs, STEP 1106. A VLAN results from virtualizing a physical protocol layer of a networking stack.

For example, physical layer 2 is virtualized to obtain a plurality of VLANs, which provide isolation over the physical layer. Thus, each set of data that comes through the network carries with it a context indicating which VLAN it is associated with and the ports (of either a physical or virtual switch) are configured to either allow the data or not based on the VLAN tag in the VLAN context.

In one particular example, based on the indication the customer makes on the hardware management console as to the VLAN to be associated with the virtual server, the Unified Resource Manager directs the hypervisor to configure the virtual switch of that hypervisor to allow that virtual server to access that VLAN and no others. In another embodiment, the Unified Resource Manager communicates with the physical switches of the top-of-racks and Ethernet switch modules to limit the virtual server access to the VLAN. In one embodiment, the URM is the authoritative control point that establishes the connection to the VLAN, thereby providing the mechanism for the user to be explicit about which virtual servers are connected to which VLANs.

VLANs can be dynamically created on the physical fibre. Because the Unified Resource Manager is the single control point through which VLANs of the Intra-Ensemble Data Network are created and access to them is permitted, and such is done by URM only after explicit customer selection, the customer is ensured that only virtual servers in the environment that have been specifically enabled to connect to certain VLANs are connected to those VLANs.

In addition to associating the virtual server with a VLAN, storage is bound to the virtual server, STEP 1108. For example, a set of tasks are provided in the hardware management console that enables the customer to select the storage to be bound to the virtual server. In one example, the storage is external storage typically in a storage area network (SAN), which is connected via fibre channels.

In one example (pertaining to POWER blades), storage access is virtualized. Thus, there are virtual SCSI adapters, and I/O is directed to the virtual I/O server (VIOS) partition of the blade. The virtual I/O server then mediates the sharing of the physical adapter across the virtual servers. For instance, each blade has a physical fibre channel adapter. Further, there are fibre channel ports on the fibre channel switch module in the chassis, which are connected to the fibre channel adapter. In one example, the fibre channel ports on the fibre channel switch module are connected to storage controllers and devices in the customer's storage area network. The customer performs various controls, such as zoning and masking, to set up which hypervisors are to access which storage devices in the storage area network. Then, the Unified Resource Manager discovers the set-up or is provided an indication of which hypervisors have access to which storage devices. The Unified Resource Manager provides this information to the customer when the virtual server is being deployed, and based on this information allows the customer to select which devices are to be associated with the virtual server. It then configures the VIOS function of the hypervisor to allow access to the storage in the selected manner.

In one example, the configuration information of the virtual server, including information regarding the processor, memory, network and storage requirements of the virtual server, is retained on the support element and not on the hypervisor. Further, the virtual server is not configured until the time at which the customer actually starts the virtual server. By storing the configuration information at the support element and not the hypervisor, the hypervisor is stateless. Thus, the hypervisor does not have any authoritative information on it, so it is easier to perform upgrades and/or other maintenance since authoritative information that might have otherwise been stored on the hypervisor does not need to be saved and restored as part of the maintenance.

Figure 12:
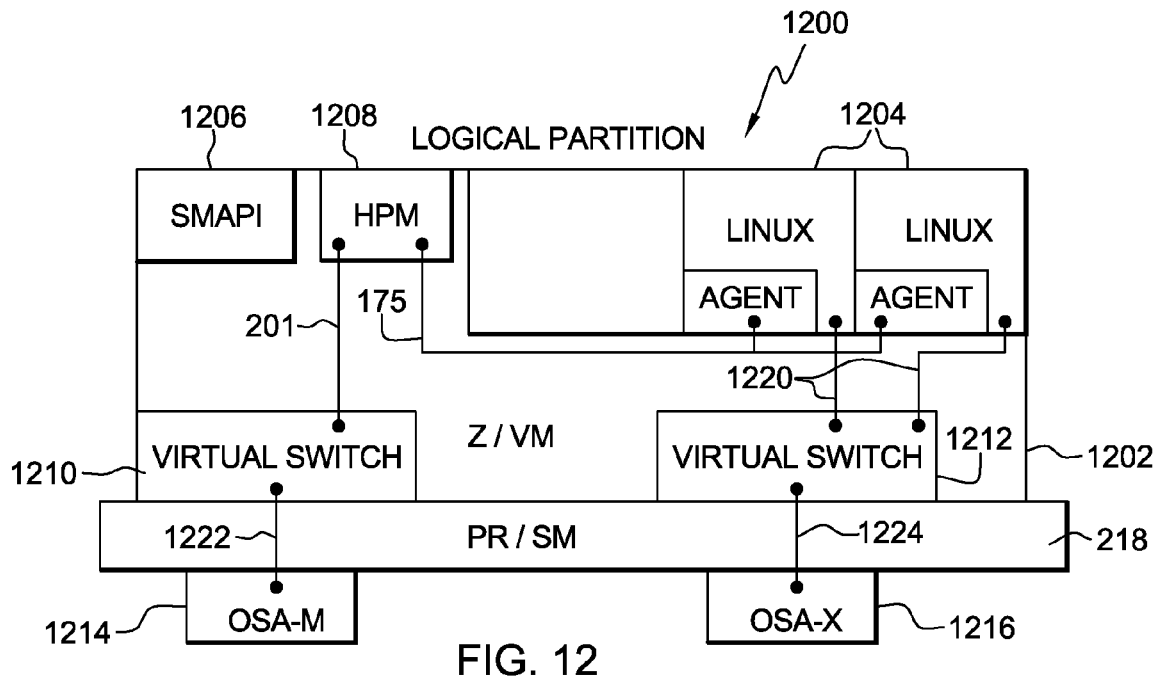
FIG. 12 depicts one example of a logical partition having virtual servers instantiated therein, in accordance with an aspect of the present invention.

In addition to virtual servers on the blades, there are virtual servers on the processing system. For instance processing system 102 may include one or more logical partitions 1200, one of which is depicted in FIG. 12. In this particular example, this logical partition includes a z/VM® hypervisor 1202 that hosts a plurality of virtual servers 1204. Within the z/VM® hypervisor, there are one or more service virtual servers including, for instance, a system management API server 1206, which is a virtual server that provides a management interface to z/VM®, and a server 1208 that hosts a hypervisor performance management agent. Virtual network connectivity is provided to the virtual servers via a plurality of virtual switches 1210, 1212 to one or more OSA adapters. In particular, virtual switch 1210 is coupled to a management port 1214 of an OSA adapter for management functions, and virtual switch 1212 is coupled to a data port 1216 of an OSA adapter for data.

Also shown in FIG. 12 are various network connections, including management network 201, agent-to-agent connections 175, one or more virtual server to virtual switch connections 1220 to the data network, a connection 1222 from virtual switch 1210 to OSA-M 1214, and a connection 1224 from virtual switch 1212 to OSA-X 1216.

Figure 13:
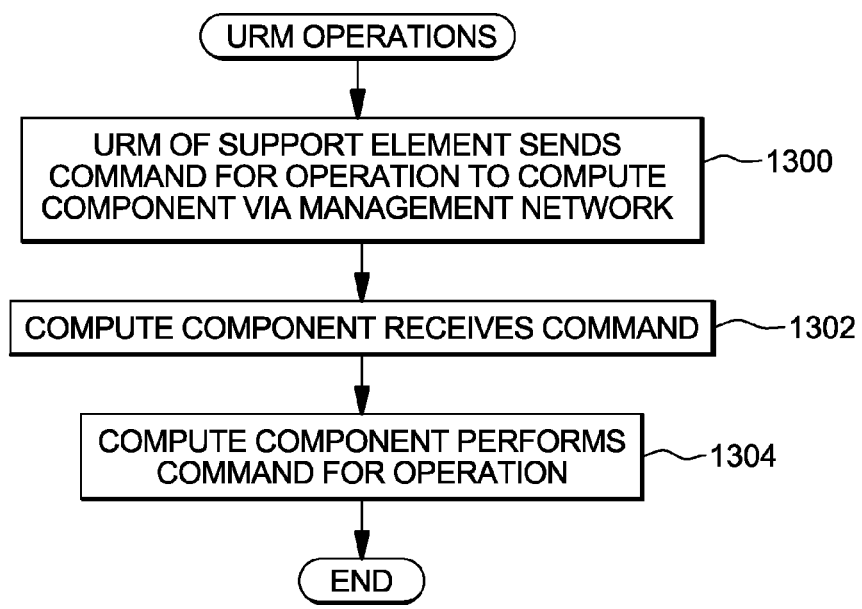
FIG. 13 depicts one embodiment of the logic associated with a Unified Resource Manager providing management controls, in accordance with an aspect of the present invention.

The installing of the hypervisors and creating new virtual servers are just two operations controlled by the Unified Resource Manager of the support element. In accordance with an aspect of the present invention, many other operations may be controlled, including monitoring, such as monitoring of resource usage, energy usage (e.g., power save, power capping), etc.; performance management; configuration; etc. One embodiment of the logic employed to control one or more operations is described with reference to FIG. 13.

Initially, the Unified Resource Manager of the support element sends a command for an operation to be performed to a compute component of the hybrid system (e.g., AMM, hypervisor) via the management network, STEP 1300. The compute component receives the command, STEP 1302. The particular compute component to receive the command depends on the particular operation to be performed. For instance, if the operation is creating a new virtual server or performing a certain monitoring operation, then the hypervisor on which the virtual server is being deployed receives the command; however, if the operation is starting a blade or a particular monitoring operation (e.g., SNMP monitoring), then the advanced management module (AMM) of the blade center chassis receives the command. Other examples are also possible. The compute component then performs the command for the particular operation being performed, STEP 1304, and the support element receives the response to the command via the management network. If there are additional commands to be processed, then the above logic is repeated.

Figure 14A:
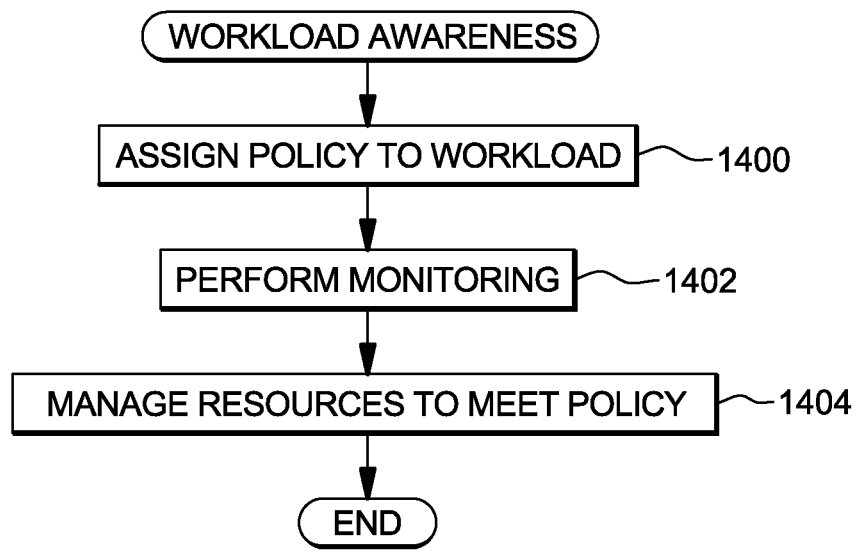
FIG. 14A depicts one embodiment of the logic associated with managing resources to meet a policy assigned to a workload, in accordance with an aspect of the present invention.

In a further aspect of the present invention, goal oriented concepts have been applied to the hypervisors. In particular, a policy is applied to a workload, which includes a plurality of virtual servers supporting a particular application (e.g., business function). Then, if the particular policy of the workload is not being met, one or more resources managed by the hypervisor, such as CPU resources, are dynamically adjusted in order to meet that policy. One embodiment of the logic associated with workload awareness is described with reference to FIG. 14A.

Initially, a workload is defined, which includes selecting the virtual servers that are to support the application and assigning the virtual servers to the workload, and a policy is assigned to the workload, STEP 1400. In one example, the policy is a performance policy defining one or more goals for managing how the hypervisor manages resources of the virtual servers of the workload. Thereafter, monitoring is performed to enable the system administrators to understand whether the objectives for the virtual servers in the workload are being achieved, STEP 1402. In particular, the Unified Resource Manager collects data from the hypervisors and the agents running within the virtual servers. The information is collected and aggregated at the support element.

Based on the information gathered in the monitoring, the hypervisors may decide to readjust resources to meet the policy that was provided for the workload, STEP 1404. In particular, in one example, it is the individual hypervisors, and in particular, the HPM agent within the hypervisors (e.g., agent 176 in the VIOS partition of a POWER blade, and/or HPM 1208 running on a z/VM® hypervisor in a logical partition), that readjusts the resources to meet a given policy (e.g., take CPU resources from one or more virtual servers and give them to another virtual server hosted on the same hypervisor; other examples are also possible).

Figure 14B:
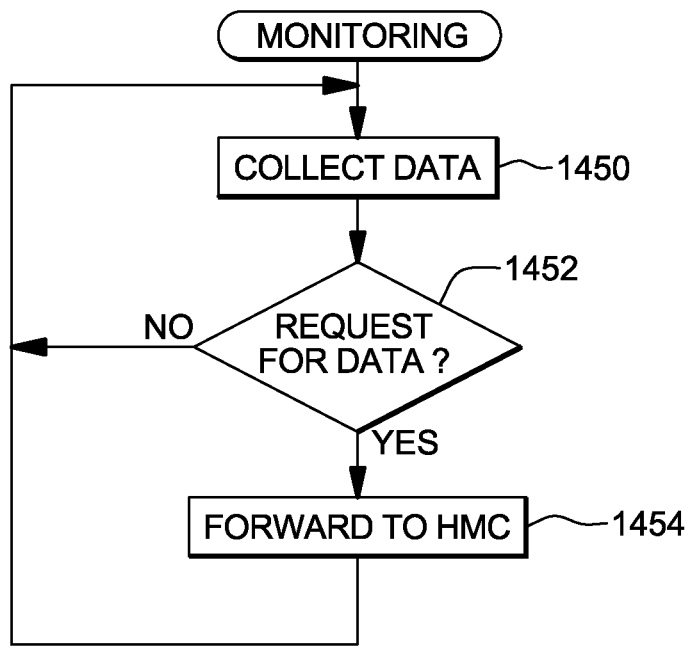
FIG. 14B depicts one embodiment of the logic associated with collecting data for workload management, in accordance with an aspect of the present invention.

In a further aspect of the present invention, the collected data is provided to the HMC upon request as further described with reference to FIG. 14B. Initially, the data is collected at the support element from the hypervisors, STEP 1450. The support element aggregates data for the hybrid system it is managing and forwards summary data to the HMC. The HMC uses the summary data to build an ensemble wide view of the data. When a monitoring report is requested on the HMC for detailed data for a specific hybrid system, the HMC requests that data from the support element managing that hybrid system. In response to this request, the support element forwards the data to the HMC. Thus, a determination is made as to whether a request has been made for a detailed report, INQUIRY 1452. If not, the data continues to be collected and aggregated, STEP 1450. Otherwise, if a detailed report has been requested, then the data is forwarded from the support element to the HMC, STEP 1454. Thereafter, the data continues to be collected by the support element.

In one embodiment, the HMC (instead of the support elements) maintains certain state relating to the workload, particularly the definition of the workload. It also maintains (ether exclusively or in addition to the support elements) performance objectives for the workloads and the relative attainment of those objectives by the virtual server of the workloads.

Workloads may be managed across an ensemble. The control point for that ensemble is the HMC, which may direct other components to perform certain actions to meet the objectives of the HMC. Management state and tasks scoped to the systems of the ensemble are maintained at, performed by and/or directed by the HMC.

The HMC has the authoritative state of the data network used by the ensemble. It maintains the information indicating which virtual servers are connected to which VLANs and which VLANs are available. It understands and has an overall view of the physical and virtual resources of the ensemble, as well as the storage accessible to the hypervisors and virtual servers.

In one embodiment, ensemble performance management is provided that includes:

Platform management component responsible for goal-oriented resource monitoring, management, and reporting across an ensemble;

Core component responsible for definition and implementation of a goal-oriented management policy, Workload monitoring and reporting based on management policy;
Orchestration of autonomic management of resources across virtual servers;
  Workload balancing;
  Optimization of virtual capacity;
  Initiation of virtual server mobility to achieve performance goals;
  Cooperative management with z/OS WLM;
Pushes management directives to the support element (SE), Hypervisors, and OS agents, as required.
HMC console Integration
Integration UI for monitoring, display of workload topology relationships, status alerts, etc.
Definition of Workload Management Goals and Policy Administration
Functionality integrated into the zHMC, SE, and Hypervisors
  Code structured and packaged as System z® firmware
  Inter-Component communication over trusted platform management network
  External APIs published in accordance with overall zHMC approach.

Described in detail above is an integrated hybrid system that logically integrates a plurality of heterogeneous systems and presents the integrated system as one system to a customer. Therefore, even if a portion of a customer's application runs on one architecture (e.g., the z/Architecture®) and another portion on one or more other architectures (e.g., POWER®, X, etc.), from the customer's perspective, it is running on a single system with a consistent hardware configuration, operation and management approach, and information regarding the application is presented based on the whole application.

In one example, the hybrid system is viewed as a single consistent hardware platform (e.g., System z) having different types of systems (e.g., z/Architecture® POWER®, x86, etc.) therein. The hardware is used to provide a single virtualized system.

In accordance with one or more aspects of the present invention, a dynamic, integrated, workload optimized hybrid system is provided that offers, for instance:
New Capabilities, Performance and Efficiency
Continued advancements in System z® technology and performance
Special-purpose compute acceleration for greater levels of workload performance and scalability
IT Infrastructure Integration
Business service workloads are inherently heterogeneous; deployed on heterogeneous system structures
A hybrid system is a heterogeneous virtualized platform, providing "One Infrastructure" integration
Dynamic IT Infrastructure Management
Align the speed of IT execution with the pace of business; dynamic, automated, policy-based resource deployment or optimization
Respond to new business opportunities faster; provision, reallocate, and optimize infrastructure resources
Manage the infrastructure in accordance with customer specified workload service level objectives
Features that are provided include, for instance:
Integrated Hardware Management across all elements of the Hybrid
  Operational Controls—e.g., those controls used to configure the hardware, perform reporting, etc. All systems are treated and reported as one system. For example, POWER® and System x® are considered part of the System z® so the reporting is that of System z®.
Firmware Inventory, Update and Service
Hardware and Firmware Problem Detection, Reporting, and Call Home, Field Guided Repair and Verify
Physical Hardware Configuration, Backup, and Restore
Secure Internal Management Network
Integrated Discovery and Resource Inventory
Integrated Hypervisors
Packaged, Deployed, and Serviced as System z® Firmware
Integrated Hypervisor Management (Configuration, Monitoring, Problem Management and Reporting, Service)
Automated Backup and Recovery of Hypervisor Configuration, Isolated from Hardware Failures
Secure Internal Management Network
Part of the Trusted Compute Base (Intrusion Prevention, Integrity, Secure Virtual Switches)
zEnterprise Data Network (IEDN)
Simple, Pre-Configured Network Configuration
Secure, Access Controlled Virtual LANs with Dynamic VLAN Provisioning
Reduced Need for Firewalls and Encryption, Reduced Network Hops
Fully Redundant for Availability
Virtualization Management
Dynamic Provisioning and Policy Driven Placement of Virtual Server Images
Server Image Mobility
Workload Awareness
Ability to represent physical and virtual resources used in the context of a Deployed Business Function (Workload)
Basis for Monitoring, Reporting, Resource Optimization, and Recovery (Service Level Objective Alignment)
Platform Performance, Availability and Energy Management
Workload Scoped, Goal Oriented Policy
Virtual Server Monitoring and Reporting
Adjustment of Virtual CPU Capacity across all Hypervisors (Multi-Hypervisor IRD)
Goal aligned Balancing Recommendations to Network Routers and DataPower
Error Monitoring and Workload Impact Reporting, and Policy Driven Resource Recovery
Integration with Multi-Site Disaster Recovery Automation
IBM Smart Analytics Optimizer
Complex Query Accelerator extension to DB2 for z/OS
Application Transparent
Query Acceleration and Consistency
Managed from DB2 for z/OS and zEnterprise hardware management
DataPower Integration
Integrated Hardware Management
Benefits from performance/simplification/security of zEnterprise Data Network
Integrated with Platform Performance Management
Key serving and management integrated with z/OS RACF key management In one or more aspects of the present invention, an integrated system is provided in which compute components of the system are controlled from a single point of control. The single point of control is attached to a management network and adheres to a management model of a selected architecture of the system (although the integrated system may include a plurality of different system architectures). The management network is configured and controlled by the single point of control of the integrated system, such that it represents a trusted path by which management commands can be presented to all other compute components of the system. The controls of the management network include controlling what is attached to it, so that other compute components, such as management modules, can authoritatively be controlled by the single point of control.

A unified resource manager attached to the management network provides the single point of control for the integrated system (or other computing environment). The unified resource manager adheres to a management model of a particular architecture and is able to send commands to the compute components of the system whether of the same architecture or not. These commands direct the performance of operations by the specific compute components. The operations include, for instance, configuration and management operations, including, for instance, loading a hypervisor on a computing system, creating a virtual server, performing monitoring, controlling energy used by the system, as well as others.

In one example, the configuration includes physically replacing a blade of a blade center chassis with another blade. In such an instance, subsequent to replacing the blade, the blade is updated to install a hypervisor and state is used that is stored on a component that is different from the blade and of a different architecture than the blade. The hypervisor, in this case, is considered stateless. In one example, the hypervisor is on a blade of the blade center chassis, and it only communicates for management functions via the management network.

In a further aspect of the present invention, an ensemble is provided that has one or more computing systems and a controller thereof. The ensemble includes a hardware management console (HMC) that understands the resources of the ensemble. It manages, for instance, the data network, including, for instance, understanding which virtual servers are connected to which virtual LANs, and which VLANs are available, and having an overall view of all the physical and virtual resources of the ensemble and storage accessible by the hypervisors and virtual servers of the ensemble. It also understands the workloads of the ensemble (which includes one or more virtual servers supporting an application) and maintains a definition of the workloads. It also includes state related to performance objectives for the workloads and the relative attainment or not of the objectives of each of the components. The HMC is the control point for the ensemble and other components have the responsibility of carrying out the commands and/or objectives of the HMC. The HMC introduces management functions and state of the ensemble, based on the fact that an ensemble exists.

In one aspect, a data network is provided. The data network includes a set of physical adapters and switches, logical or network switching functions and controls. Configuration of the components to provide a data network is exclusively the responsibility of a controlling function. The physical components, which include hypervisors, because they have virtual switches in them, are controlled through the management network. A single control point (e.g., URM) attached to the management network is provided for discovering the networking elements of the data network and for taking exclusive authority to configure and allocate the physical and virtual network resources through the management network. The networking resources of the data network are compute components managed by URM. The URM (of the HMC component) understands the current allocation of virtual networks across the ensemble and is responsible for accepting requests allowing for a life cycle of the virtual LANs (create/destroy) and providing a mechanism to associate and connect virtual servers to a given VLAN.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 15:
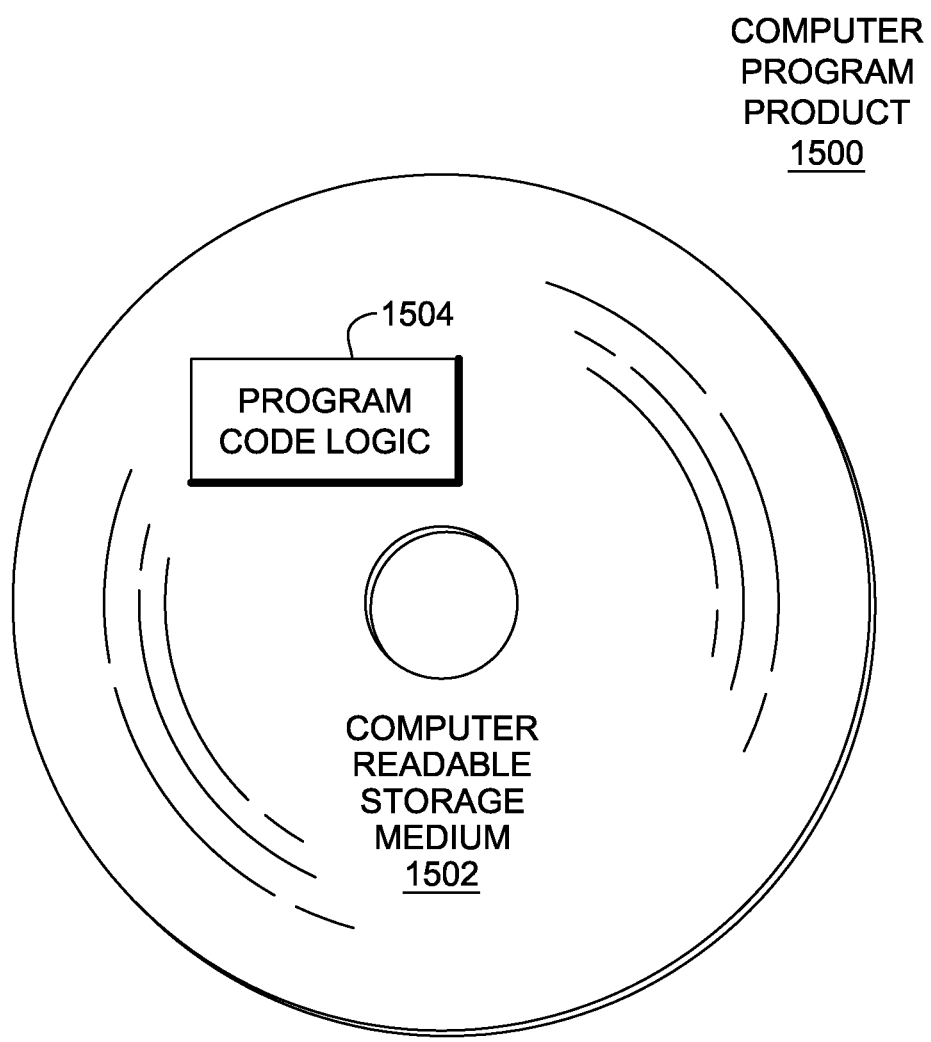
FIG. 15 depicts one embodiment of a computer program product incorporating one or more aspects of the present invention.

Referring now to FIG. 15, in one example, a computer program product 1500 includes, for instance, one or more computer readable storage media 1502 to store computer readable program code means or logic 1504 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, other operating systems or systems may be used. Additionally, the single point of control may be of an administrative or management model of a system other than System z® or zEnterprise™ or of an architecture other than the z/Architecture®. An ensemble may have one system (hybrid or not) or a plurality of systems (hybrid or not). An HMC may control a single system, a single hybrid system and/or an ensemble. Although particular examples of blade extensions, blade racks, blade center chassis and blades have been provided, these are only examples; others may be used without departing from the spirit of the present invention. Many other variations are also possible and considered a part of the claimed invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating performing operations of a computing environment, said computer program product comprising:
a non-transitory computer readable storage medium readable by a processing circuit and storing instructions for execution by the processing circuit for performing a method comprising:
receiving by a first component of a first computing system of a first system architecture a command from a resource manager of a second component of a second computing system of a second system architecture, said second system architecture being different from said first system architecture, wherein said resource manager and said first computing system adhere to a management model of the second computing system, the management model facilitating presentation of the first computing system and the second computing system as being a single system having a consistent resource configuration and system behavior on which to run customer-deployed applications, wherein the customer-deployed applications run at least partially on the first and second computing systems; and
performing the command by the first component, the command used in controlling an operation according to the management model adhered to by the resource manager providing the command.

2. The computer program product of claim 1, wherein the second component comprises a support element and wherein the resource manager comprises firmware located within the support element.

3. The computer program product of claim 2, wherein the support element maintains a state in which the first computing system is configured, the state comprising at least one resource requirement for configuring the first computing system, in which the state in which the first computing system is configured is loaded at boot time of the first computing system and the first computing system is configured with a resource based on the state maintained by the support element.

4. The computer program product of claim 1, wherein the operation comprises loading a hypervisor on the first computing system, and wherein the receiving comprises receiving the command by a management module of the first computing system, the management module to load the hypervisor on the first computing system.

5. The computer program product of claim 1, wherein the operation comprises creating a virtual server within the first computing environment, and wherein the receiving comprises receiving the command by a hypervisor of the first computing system, the hypervisor to create the virtual server to be hosted by the hypervisor.

6. The computer program product of claim 1, wherein the operation comprises performing one or more controls to manage energy consumption, and wherein the receiving comprises receiving the command by a management module of the first computing system, the management module to perform the one or more controls.

7. The computer program product of claim 1, wherein the operation comprises monitoring one or more resources of the first computing system, and wherein the receiving comprises receiving the command by a management module of the first computing system, the management module to perform the monitoring.

8. The computer program product of claim 1, wherein the first computing system comprises a blade extension and wherein the operation comprises updating a blade of the blade extension, wherein the updating uses state stored at the second computing system.

9. The computer program product of claim 8, wherein the updating comprises one of upgrading the blade or updating the blade based on blade replacement.

10. The computer program product of claim 8, wherein the updating comprises re-creating one or more virtual servers on the blade using the state stored at the second computing system.

11. The computer program product of claim 1, wherein the resource manager is a single resource manager.

12. A computer system for facilitating performing operations of a computing environment, said computer system comprising:
a memory; and
a processor in communications with the memory, wherein the computer system is configured to perform a method, said method comprising:
receiving by a first component of a first computing system of a first system architecture a command from a resource manager of a second component of a second computing system of a second system architecture, said second system architecture being different from said first system architecture, wherein said resource manager and said first computing system adhere to a management model of the second computing system, the management model facilitating presentation of the first computing system and the second computing system as being a single system having a consistent resource configuration and system behavior on which to run customer-deployed applications, wherein the customer-deployed application run at least partially on the first and second computing systems; and performing the command by the first component, the command used in controlling an operation according to the management model adhered to by the resource manager providing the command.

13. The computer system of claim 12, wherein the second component comprises a support element that maintains a state in which the first computer system is configured, the state comprising at least one resource requirement for configuring the first computing system, in which the state in which the first computing system is configured is loaded at boot time of the first computing system and the first computing system is configured with a resource based on the state maintained by the support element, and wherein the resource manager comprises firmware located within the support element.

14. The computer system of claim 12, wherein the operation comprises loading a hypervisor on the first computing system, and wherein the receiving comprises receiving the command by a management module of the first computing system, the management module to load the hypervisor on the first computing system.

15. The computer system of claim 12, wherein the operation comprises creating a virtual server within the first computing environment, and wherein the receiving comprises receiving the command by a hypervisor of the first computing system, the hypervisor to create the virtual server to be hosted by the hypervisor.

16. The computer system of claim 12, wherein the operation comprises performing one or more controls to manage energy consumption, and wherein the receiving comprises receiving the command by a management module of the first computing system, the management module to perform the one or more controls.

17. The computer system of claim 12, wherein the operation comprises monitoring one or more resources of the first computing system, and wherein the receiving comprises receiving the command by a management module of the first computing system, the management module to perform the monitoring.

18. The computer system of claim 12, wherein the first computing system comprises a blade extension and wherein the operation comprises updating a blade of the blade extension, wherein the updating uses state stored at the second computing system.

19. The computer system of claim 12, wherein the resource manager is a single resource manager.

* * * * *